April 1, 1941.    G. A. LOCKE ET AL    2,237,154
TELEGRAPH EXCHANGE SYSTEM
Filed June 7, 1930    8 Sheets-Sheet 5

INVENTORS G. A. LOCKE
F. S. KINKEAD
BY J. W. Schmied
ATTORNEY

April 1, 1941.   G. A. LOCKE ET AL   2,237,154
TELEGRAPH EXCHANGE SYSTEM
Filed June 7, 1930   8 Sheets-Sheet 6

INVENTORS
G. A. LOCKE
F. S. KINKEAD
BY
*J. N. Schmied*
ATTORNEY

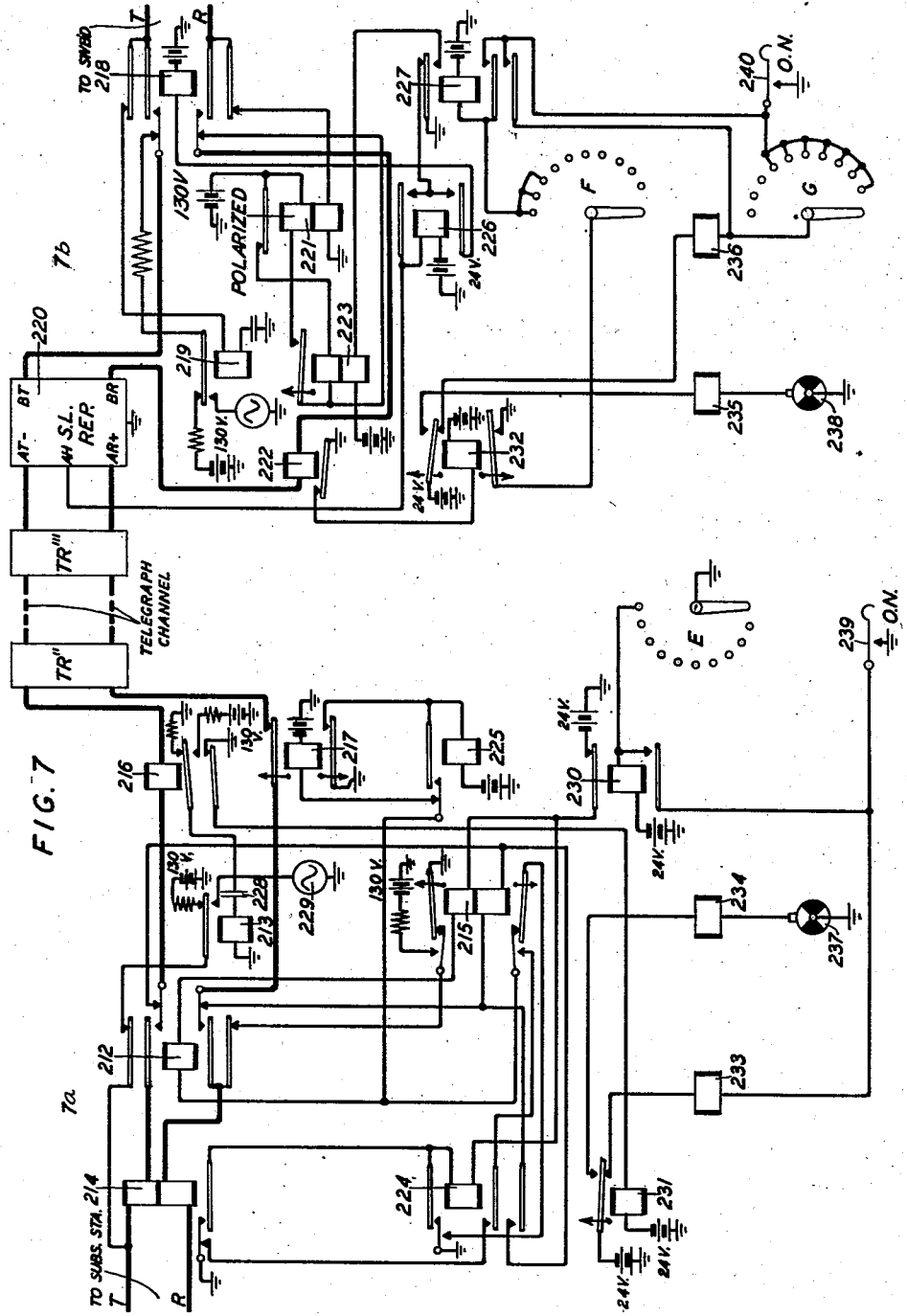

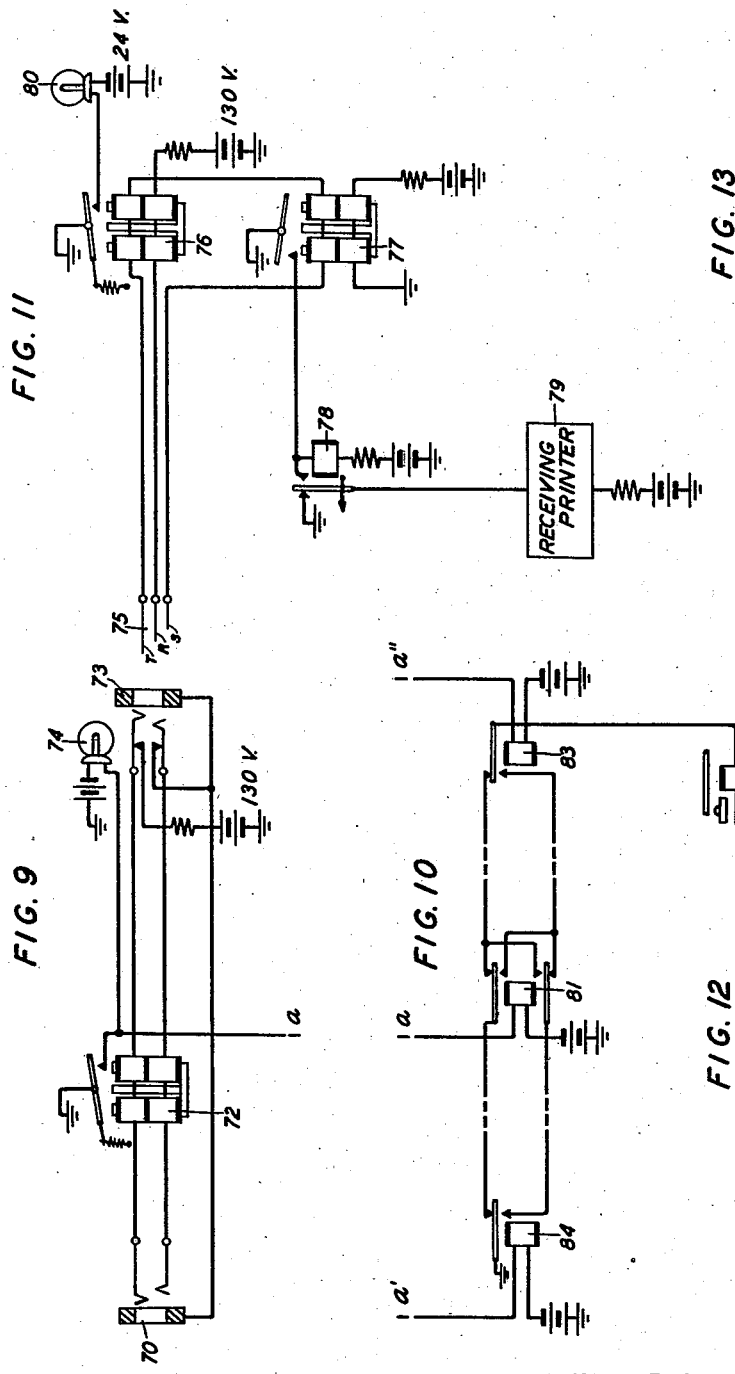

Patented Apr. 1, 1941

2,237,154

UNITED STATES PATENT OFFICE 2,237,154

TELEGRAPH EXCHANGE SYSTEM

George A. Locke, Glenwood, and Fullerton S. Kinkead, Brooklyn, N. Y., assignors to Bell Telephone Laboratories, Incorporated, New York, N. Y., a corporation of New York Application June 7, 1930, Serial No. 459,684

124 Claims. (Cl. 178—2)

This invention relates to a printing telegraph exchange system by means of which connections may be established quickly and efficiently for communication purposes between any of a plurality of subscribers' telegraph stations, and further by means of which such connections are to remain thus established for more or less temporary intervals in accordance with the wishes of the subscribers.

In short, the invention aims to provide between subscribers' telegraph stations the same type of service that is now provided between telephone stations. At the present time any telephone user may obtain a connection with any other such user by merely signaling the operator. In a similar manner, the telegraph exchange system disclosed herein provides means whereby any telegraph station served by the exchange system may obtain connection with any other such station by merely signaling the operator at a central office to which the telegraph station is connected.

Accordingly, a primary object of the present invention is to provide a flexible switching system for quickly establishing and tearing down communication circuits between any of a plurality of subscriber's printing telegraph stations or between a subscriber's station and an operator's printer set located at a central office.

A feature of this invention lies in the means used to indicate to the operator the progress of the building up and tearing down of a complete connection between subscribers.

Another feature lies in a non-interfering circuit which permits the telegraph circuit of only the first of several operators answering a signal to be connected with the trunk or loop circuit over which the signal is being transmitted.

Another feature is a switching device for opening a communication circuit between subscribers and for establishing a connection between the operator's printer set and either subscriber.

Another feature is the provision of automatic machine ringing for signaling purposes.

A further feature is the "conference" circuit which is used for establishing a connection involving more than two subscribers' stations for receiving a communication simultaneously.

A still further feature is a method of connection of an operator's telegraph set which permits an operator at a central office to answer signals from cord circuits on positions adjacent to such operator. This feature is known as "teaming."

Other objects and features will appear in the subsequent detailed disclosure.

The telegraph exchange system broadly comprises a group of subscribers' telegraph stations each connected to a given central office over an individual loop circuit with other groups of subscribers' stations similarly connected to other central offices. Telegraph trunk circuits extend between the central offices in question and cord circuits are provided at each central office for connecting any subscriber's line with any other such line in the same office or for connecting a subscriber's line to a trunk circuit for connection to a distant station.

Referring to the drawings:

Fig. 1 shows the circuit diagram of a subscriber's loop circuit including the apparatus associated with the loop at the central office as well as at the subscriber's station. This circuit is individual to each subscriber's loop and includes suitable audible and visible indicating equipment.

Fig. 2 illustrates in schematic form a two-way repeater cord circuit. Connected to and/or forming a part of this cord circuit are shown several novel features of this invention. In Fig. 2 the relays 145, 178, 181 and 182 together with the lamp 127 and the alarm 183 are not individual to a cord circuit but are common to all the cord circuits of a position; relays 41, 42 and 44 and the devices controlled by them are common to all the positions in an exchange.

Figs. 6 and 7 show different long line subscribers' extension circuits.

Figs. 9, 10, 11 and 12 show the link and cord circuits associated with an observer operator's circuit.

Fig. 13 shows a special type of jack for the cut-off alarm feature.

Fig. 14 illustrates an out-of-order busy cord.

General features of system

Figure 8:
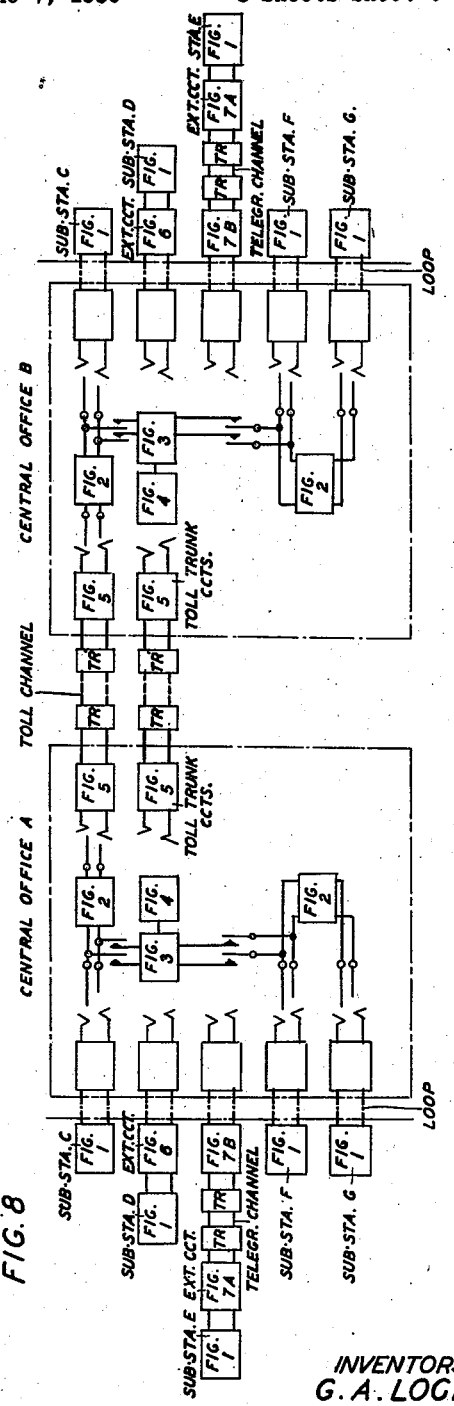
Fig. 8 shows in schematic form the essential elements of a complete telegraph exchange system embodying the features of the invention.

The numbers herein referred to in connection with Fig. 8 represent the numbers of the figures which are shown in detail in other circuit arrangements.

The telegraph exchange system shown in Fig. 8 comprises two central offices A and B located at some distance from one another. Toll line trunk circuits Fig. 5 connect offices A and B. Each trunk circuit is shown having terminal repeater stations nearest the central office. A plurality of subscribers' stations C, D, E, F and G are connected over individual loops to office A. Similarly, subscribers' stations C, D, E, F and G are connected to office B. Long line subscribers D and E are shown connected to central offices A and B through extension circuits Fig. 6 and Figs. 7a and 7b, respectively. Long line extension circuits Fig. 6 and Figs. 7a and 7b are located usually at a telegraph repeater station and are only used to connect to a subscriber located at a great distance from the central office. When a very long telegraph channel is utilized to connect the distant subscriber's loop with a central office, Figs. 7a and 7b are employed with a terminal repeater station located at Fig. 7a and another at Fig. 7b; when a comparatively short metallic circuit is utilized to connect the distant subscriber's loop with a central office, circuit Fig. 6 is employed. The rectangles which are connected to Fig. 1 indicate the signaling and switching apparatus associated with the subscriber's loop circuits at the central offices while the rectangles Fig. 5 indicate similar apparatus for the trunk circuits. Each central office is equipped with at least one position to which an operator's printer set is connected. A supervisor operator's set Fig. 4, which is common to many positions, is shown connected to operator's set Fig. 3. Each position at a central office is equipped with a plurality of connecting two-way repeater cords Fig. 2 for establishing connections between the subscribers' stations, subscribers' stations and trunk circuits, or between trunk circuits.

Figure 2:
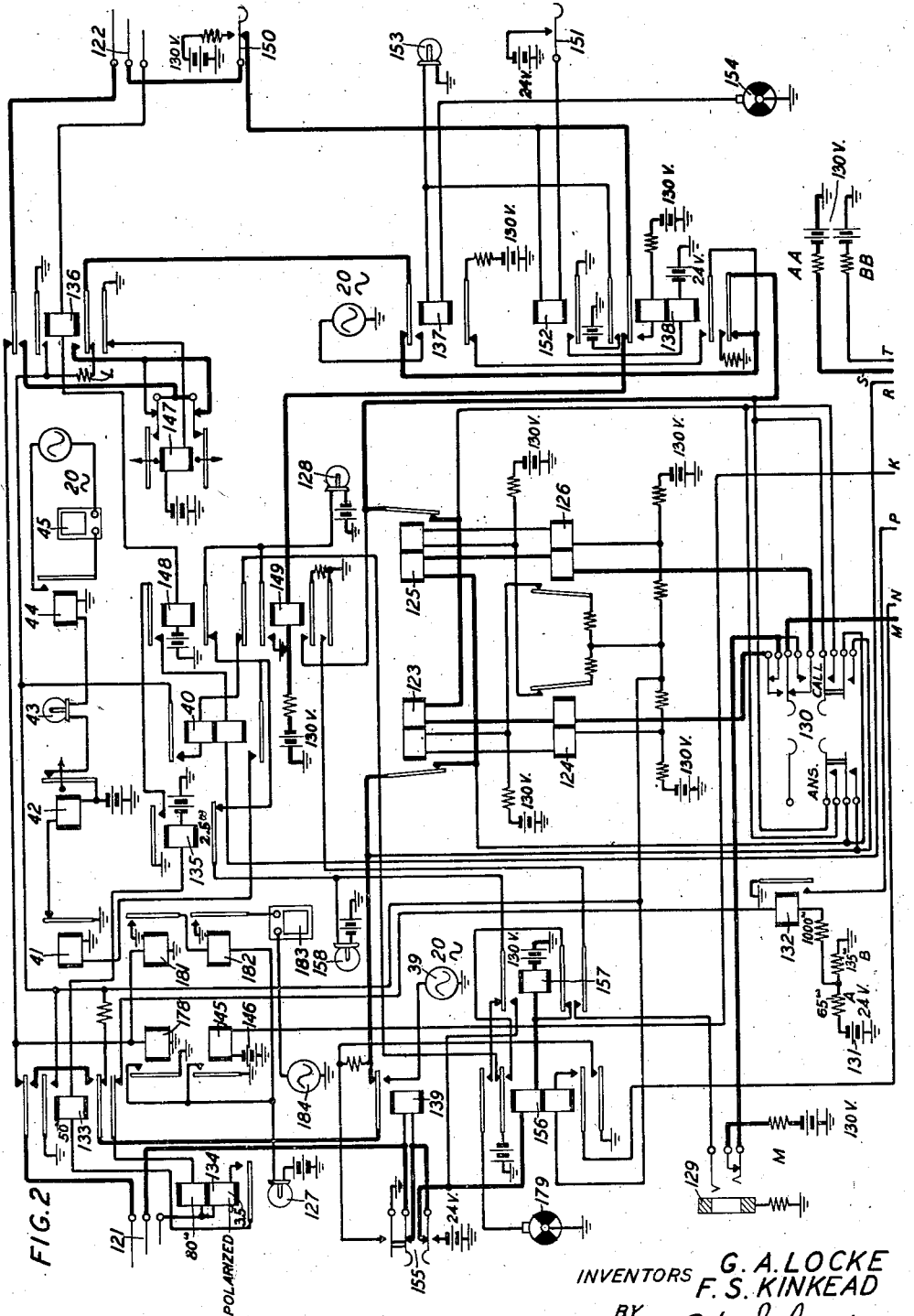

The manner of establishing a connection between local subscribers' stations is shown for stations F and G, the connection being established by connecting the repeater cord Fig. 2 between the jacks of the respective loop circuits. A trunked circuit connection between subscribers located at distant central offices is indicated as extending between stations C and C of central offices A and B respectively. At office A connecting cord Fig. 2 extends between the connecting jack for station C and the connecting jack of the toll trunk circuit Fig. 5. Similarly, at office B connecting cord Fig. 2 extends between the connecting jack for station C and the connecting jack of the toll trunk circuit Fig. 5. A built-up connection between distant stations may be etsablished over several central offices, in a similar manner, by using central office B as an intermediate office and connecting cord circuit Fig. 2 at B to another toll trunk circuit extending from B to an additional central office.

In Fig. 8 it will be noted that the trunk and subscribers circuits are shown as two wire circuits. These wires are hereinafter referred to as the tip (T) and ring (R) wires. In general, the communication path for the subscriber from the station to the central office is traced over both the tip and ring wires. As regards the cord and trunk terminating circuits however, the communication path is traced over the tip wire only; the ring side being used for supervision and control purposes.

Local connection

The explanation given above in connection with Fig. 8 furnishes a general picture of the exchange system operation as a whole. The various types of circuit connections will now be taken up in detail by first considering a local connection, i. e., a connection between two subscribers having loop circuits terminating in the same central office. A connection of the type here contemplated is similar to that shown in Fig. 8 between stations at F and G.

Figure 1:
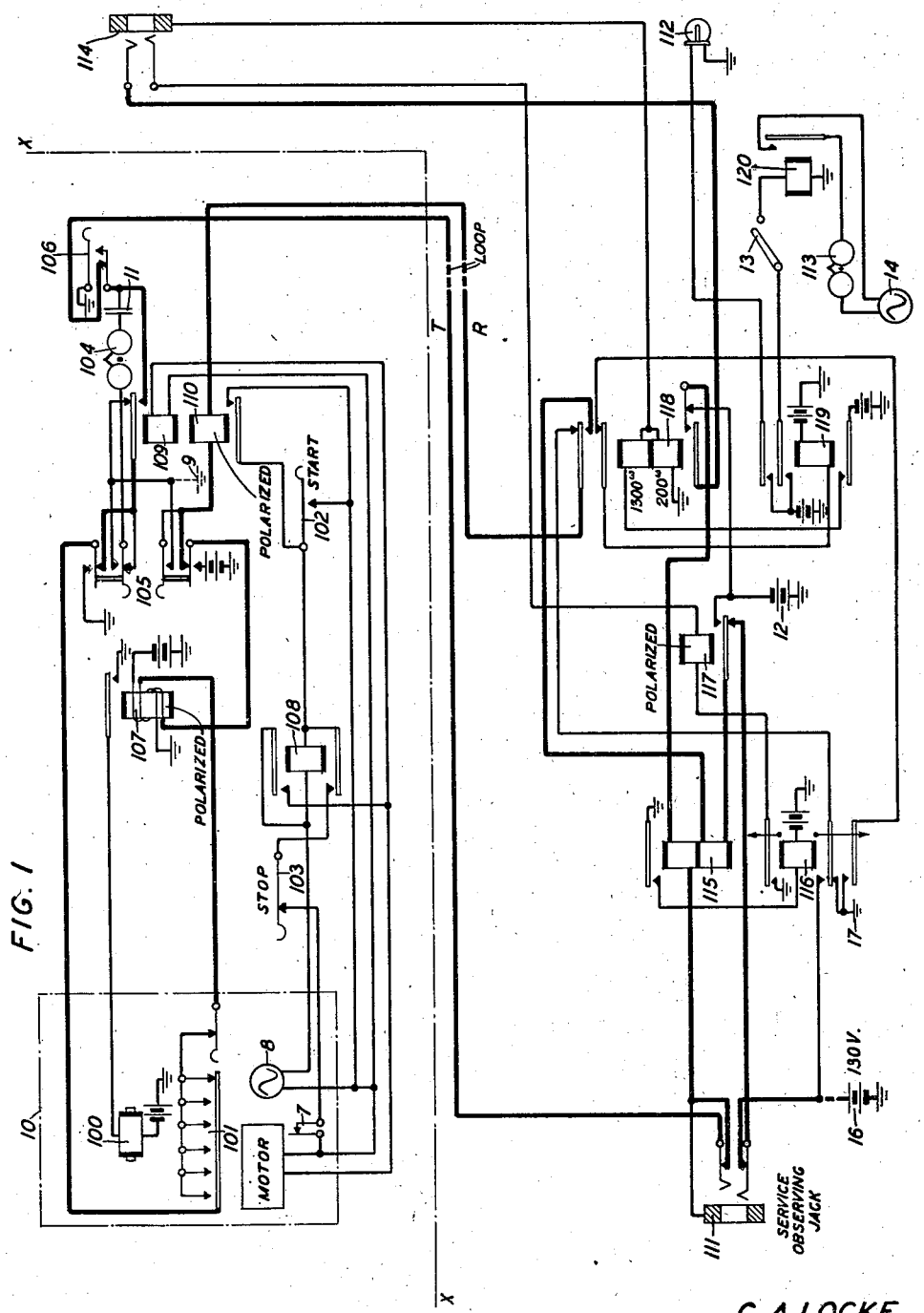

Referring to Fig. 1 which shows the subscribers' loop circuit, the equipment above and to the left of line X—X is located at the subscriber's station while the equipment below and to the right of line X—X is located at the central office. The equipment at the subscriber's station comprises a printing telegraph sending and receiving unit 10, comprising a printer magnet 100, a set of sending contacts 101 and a suitable motor equipped with a pair of contacts which will open by mechanical means when motor stop signals are sent. External of the printing telegraph set and also located at the subscriber's station are switch 102 for starting the printer set motor, a stop or break key 103 for stopping the prniter set, and bell 104 whereby the central office may signal the subscriber's station, a test key 105 for testing locally the printer set while the loop is arranged so that the operator can ring, a flash key 106 for signaling the operator at the central office and several relays, the functions of which will be explained.

At the central office the tip T of the loop circuit terminates in a jack 114. A line lamp 112 and an auxiliary bell 113 are associated with the equipment at the central office whereby the subscriber may signal the operator. In addition, there are provided several relays, to be discussed, for operating the signaling circuits.

The repeater cord, which is necessary for establishing a connection between local subscribers' lines is shown in Fig. 2. This cord contains a single line repeater circuit for repeating signals in either direction between lines to which it is connected by means of answering plug 121 and calling plug 122. The repeater unit comprises a group of four polarized relays 123 to 126 inclusive, each having line and auxiliary windings interconnected in shunt. A detailed explanation of the operation of this repeater unit will not be given in this application since a repeater of this type is fully described in U. S. Patent No. 1,752,436 to F. S. Kinkead dated April 1, 1930 which disclosure is hereby made a part of this present specification as if fully included herein. Associated with plugs 121 and 122 are signaling lamps 127 and 128 used for indicating to the operator the progress of a call. The manner of operation of the relays and their functions will be described in detail later.

Figure 3:
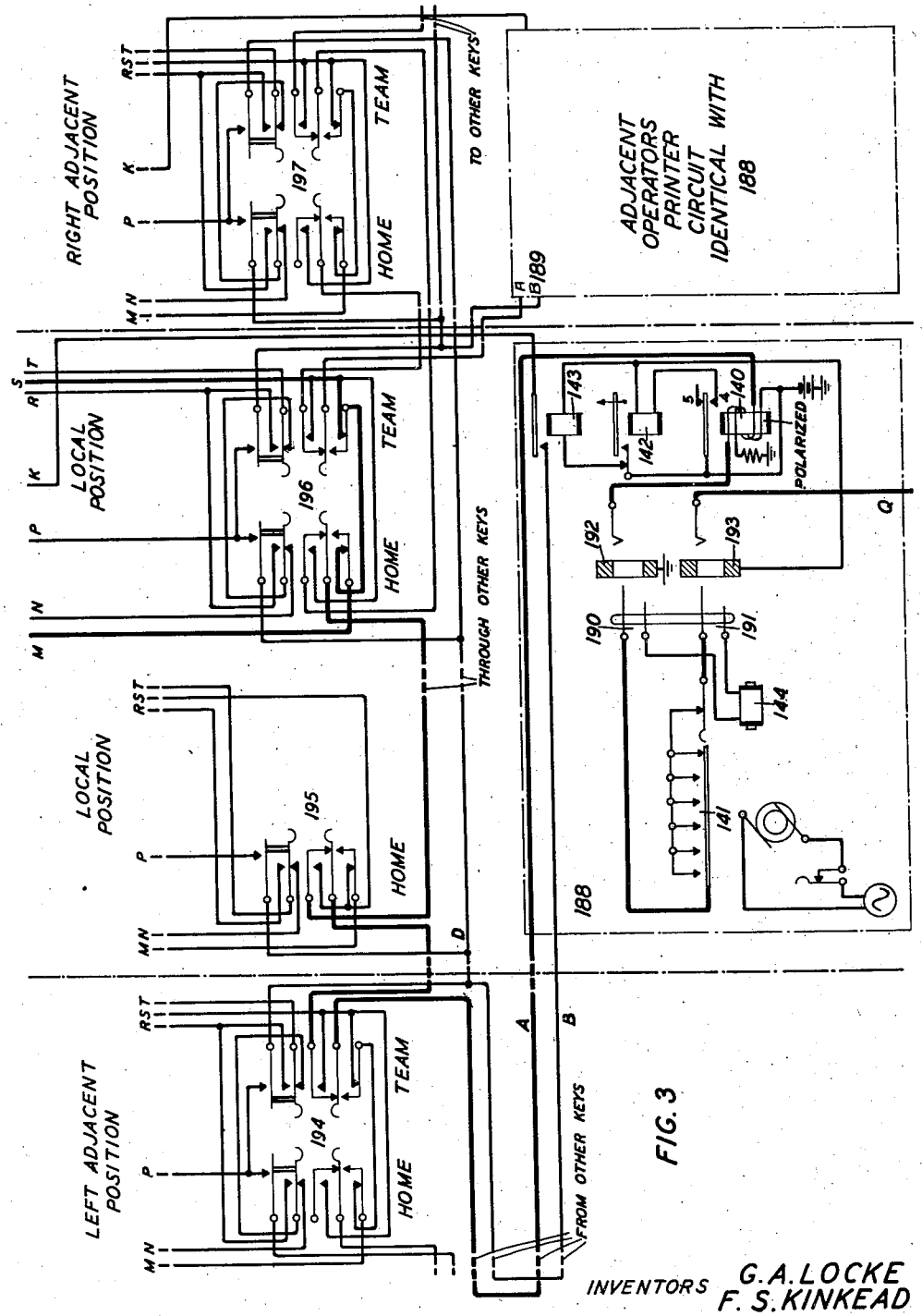
Fig. 3 shows a special circuit arrangement for the operator's printer telegraph set with its associated key equipment for connecting the printer set with a cord circuit in the local position or in an adjacent operator's position.

Fig. 3 shows the operator's printer telegraph circuit 188 which is used for communicating with subscribers when establishing a connection. The operator's printer set is connected to jacks 192 and 193 by means of plugs 190 and 191 and then to the cord circuit of Fig. 2 through key 196. An operator's telegraph printer circuit is provided for each operator's position. Located at each position are a plurality of cord circuits with which the printer circuit is associated through a looping arrangement on a set of keys, each cord circuit being provided with an individual key for connecting that circuit with the operator's printer circuit. Keys 195 and 196 are shown located in the same operator's position as circuit 188. Key 194 is shown in a position adjacent to 188 and to the left of it; key 197 is shown in the position adjacent to 188 and to the right of it. Operator's circuit 188 is capable of answering subscribers signal over cord circuits located on adjacent positions through keys 194 and 197 in a manner to be hereinafter described. In a similar manner operator's printer telegraph circuit 189 to the right of 188 and adjacent to it is shown connected to key 197.

Having briefly discussed the various circuit elements involved in establishing a connection between local subscribers' lines, the manner in which this connection is established will now be described in detail. Referring to Fig. 1, under normal conditions a circuit may be traced through the bell ringer 104 from the tip side T of the loop, over key 106, condenser 11 and bell 104, swinging contact of key 105, normal break contact of relay 109 to ground 9. Also, ground is normally connected to the ring side of the loop on a path from ring R through the winding of relay 110, contact of key 105, one winding of relay 107, contact 101 of operator's printer set, upper contact of key 105, normal break contact of relay 109, to ground 9. Assuming that the subscriber desires to initiate a call, start switch 102 will be pressed, which closes a circuit from one side of power supply circuit 8 through the winding of relay 108 to the other side of the power supply, causing relay 108 to operate. Relay 108, in operating, locks up through its lower contact, contact of stop key 103 to the motor control contacts 7 of the printer. In operating, relay 108 closes a path through its upper contact to start the motor for the printer set and also to operate relay 109 through the same circuit.

The operation of relay 109 opens the bell ringer circuit over the tip T of the loop, removes ground from the ring side R of the loop and closes the T and R leads of the loop through the subscriber's station set to operate relay 115 at the central office. This last circuit is traced from negative battery 12 at the central office through the lower break contacts of relay 118, upper winding of relay 115, tip side of jack 111, T of the loop, flash key 106 located at the subscriber's station, make contact of relay 109, contact of key 105, sending contacts 101 of the printer set, one winding of relay 107, lower contact of key 105, winding of relay 110, R of loop, break contacts of relays 118 and 116 in the central office to ground 17. The operation of relay 115 completes a path to operate relay 116 from ground on the armature and contact of 115 to battery through the winding of relay 116. The operation of relay 116 in turn operates relay 119. This circuit is traced from ground on the lower make contact of relay 116 through upper inner break contact of relay 118 through the winding of relay 119 to battery. Incidentally, relay 115 is kept from releasing when relay 116 operates by the substitution of positive battery 16 on the lower make contact of relay 116 for ground 17. This positive battery over ring side R of the loop is traced back over side T of the loop to negative battery 12 as mentioned hereinbefore. Relay 119, in operating, lights lamp 112 from battery on the upper make contact of 119 to ground through lamp 112 indicating to the operator that the subscriber is calling. If desired, the operation of relay 119 may be made to operate a night alarm bell or buzzer circuit by merely operating switch 13 to connect relay 120 to battery on the upper inner contact of relay 119. With this arrangement, when relay 119 operates, relay 120 will operate to close a circuit containing generator 14 in series with bell 113. The operation of relay 119 not only lights the line lamp but connects battery from the lower contact of relay 119 through the secondary winding of relay 118 to the sleeve of jack 114 to put a busy indication on the sleeve of jack 114. The secondary winding of relay 118 is connected in opposition to the primary winding and prevents relay 118 from operating.

The operator at the central office answers the call by inserting answering plug 121, Fig. 2, of the cord circuit into jack 114 of the subscriber's line. This energizes relay 118 as hereinafter described and thus extinguishes the lamp 112. The operation of key 196, Fig. 3, associated with the cord circuit connects the operator's printer telegraph set 188 to the loop circuit for communication with the subscriber's printer. Upon insertion of plug 121 in jack 114 a circuit is completed to operate relays 132 and 134 to ground from negative battery 131 in the cord circuit through resistance A of the potentiometer comprising resistances A and B through the winding of relay 132, lower outer break contact of relay 133, through the upper winding of relay 134 to the sleeve of plug 121, sleeve of jack 114, primary winding of relay 118 to ground, thus operating relays 132 and 134. Relay 118 will now operate. Although the circuit to operate relays 132 and 134 was completed through the winding of relay 118, it will be noted that relay 118 does not operate until polarized relay 134 operates. Relay 118 is designed not to operate on the small current supplied through the high resistance circuit previously traced. The operation of relay 134 causes the operation of relay 118 on a path traced through the low resistance secondary winding of relay 134 and the low resistance windings of relays 133 and 135 to battery. Upon the operation of relay 118, the circuit path previously used to operate relay 119 will be opened and relay 119 will release causing the extinguishment of line lamp 112. The operation of relay 118 transfers the ring side of the loop circuit R from positive battery 16 on the make contact of relay 116 to the same positive battery through upper make contact of relay 118, through the lower winding of relay 115, break contact of relay 117 and ring contact of jack 111. The operation of relay 134 causes it to lock up from ground through the winding of relay 118, through the sleeve of jack 114, through the secondary winding and lower contact of relay 134, winding of relay 133, winding of relay 135 to battery, thus operating relays 133 and 135. The operation of relay 133 applies ground from its upper inner armature through the L resistance, lower inner break contact of relay 136, upper contact of relay 137, lower break contact of relay 138, contact of relay 125, one winding each of relays 123 and 124, contact of key 130, contact of conference jack 129, through a resistance M to negative 130 volt battery. This causes the repeater in the cord circuit to close, thus making it possible for the operator's set shown in Fig. 3 to be connected to the answering cord associated with key 196, upon the operation of this key to the "home" position.

The operation of relay 133 connects the tip of the plug 121 through the upper outer and lower inner make contacts of relay 133, break contact of relay 139, contact of relay 123, one winding each of relays 125 and 126, right side contact of key 130, lead M, lower left side and right side contacts of key 196 (normal position), Fig. 3, lead S to negative battery, Fig. 2, through resistance AA. This negative battery on the tip of plug 121 completes a path over the tip of jack 114, through the lower make contact of relay 118, upper winding of relay 115, contact of jack 111 and T of the loop, back over R of the loop, upper outer make contact of relay 118, lower winding of relay 115, break contact of relay 117, jack 111 to positive battery 16. This circuit energizes both windings of relay 115, the windings of which are wound differentially so as to oppose each other, causing the relay to release and in turn to release relay 116.

The busy condition on the sleeve of jack 114, formerly obtained by battery from the lower make contact of relay 119, is replaced upon insertion of plug 121 and upon the release of relay 119 by battery from the sleeve of the cord circuit.

The operator connects her telegraph printer set to the cord circuit by operating key 196, which is associated with the cord circuit previously inserted in jack 114, to the "home" position. This action connects the operator's printer in series with the answering side of the single line repeater, this side having been closed by the operation of relay 133 as hereinbefore described. Consequently, communication may now take place between the operator and the subscriber through the cord circuit and into the line to which the cord is connected. This circuit is traced from tip of answering plug 121, upper and lower make contacts of relay 133, break contact of relay 139, make contact of relay 123, one winding each of relays 125 and 126, contact of split key 130, lead M, lower left make contact of key 196, "home" position, normal break contact of key 195, normal break contact of key 194 in adjacent left position, lead A, one winding of relay 140 in the operator's telegraph circuit, tip of jack 192, tip of operator's plug 190, sending contacts 141, plug 191, tip of jack 193 Q lead, to supervisor operator's telegraph circuit, Fig. 4, through the normal break contact of key 180, to negative battery 47 thus operating relay 140. Relay 140, in turn, operates relay 142 from battery through the operated contact of 140, winding of relay 142, sleeve of jack 193, plug 191, winding of printer magnet 144, plug 190, sleeve of jack 192, to ground.

Under normal conditions when the operator's set is not connected to a cord circuit the circuit through the A lead is opened. The armature of relay 140 is then held against its contact 5 by a local biasing current and relay 143 is kept operated from battery through the normal break contact of relay 142, winding of relay 143, sleeve of jack 193, plug 191, winding of printer relay 144, plug 190, to ground on sleeve 192 holding operated printer magnet 144. When the printer is not in use, magnet 144 is therefore held locked up, thus preventing a free whirling of the printing telegraph set. Printer magnet 144 is also held operated when the operator's printer set is in use and current is flowing in lead A. This current will overcome the biasing current of relay 140 and operate 140. This operation will move the armature of relay 140 from its contact 5 to its contact 4 operating relay 142, as previously described, and releasing relay 143. The printer will now be under control of relay 140. Relay 142 is a slow release relay so that it will remain operated while relay 140 is following the printer signals either received from the line or sent to the line from the printer keyboard. Relay 143 also serves to indicate to an operator that a line has already been answered by another operator or that the line to which she is connected is open. Relay 145 and lamp 127 which are controlled by relay 143 are common to all the cord circuits of a position and serve to give the indication just described. The operation by which this is accomplished will now be described. If a cord circuit on which a listening key is operated is used to answer a call which another operator has already answered the second cord circuit will not be connected to the line due to a non-interfering feature of the cord circuit, which will be subsequently described, in which case the A lead will be opened, relay 142 released and relay 143 operated thus completing a circuit from battery 146, Fig. 2, winding of relay 145, K lead, make contact of relay 143 in operator's circuit, B lead, D lead, upper make contact of key 196, P lead, to ground on contact of relay 132 in the cord circuit. Relay 132 in the cord circuit will always operate when a cord is inserted in a line jack on a circuit from ground through relay 118 Fig. 1 notwithstanding the fact that another cord is already inserted in the multiple of the particular line jack. The operation of relay 145, Fig. 2 will close a circuit to light lamp 127 as a visible indication to the operator. This circuit is traced from battery through the lamp 127 to ground upon the contact of relay 145.

Figure 4:
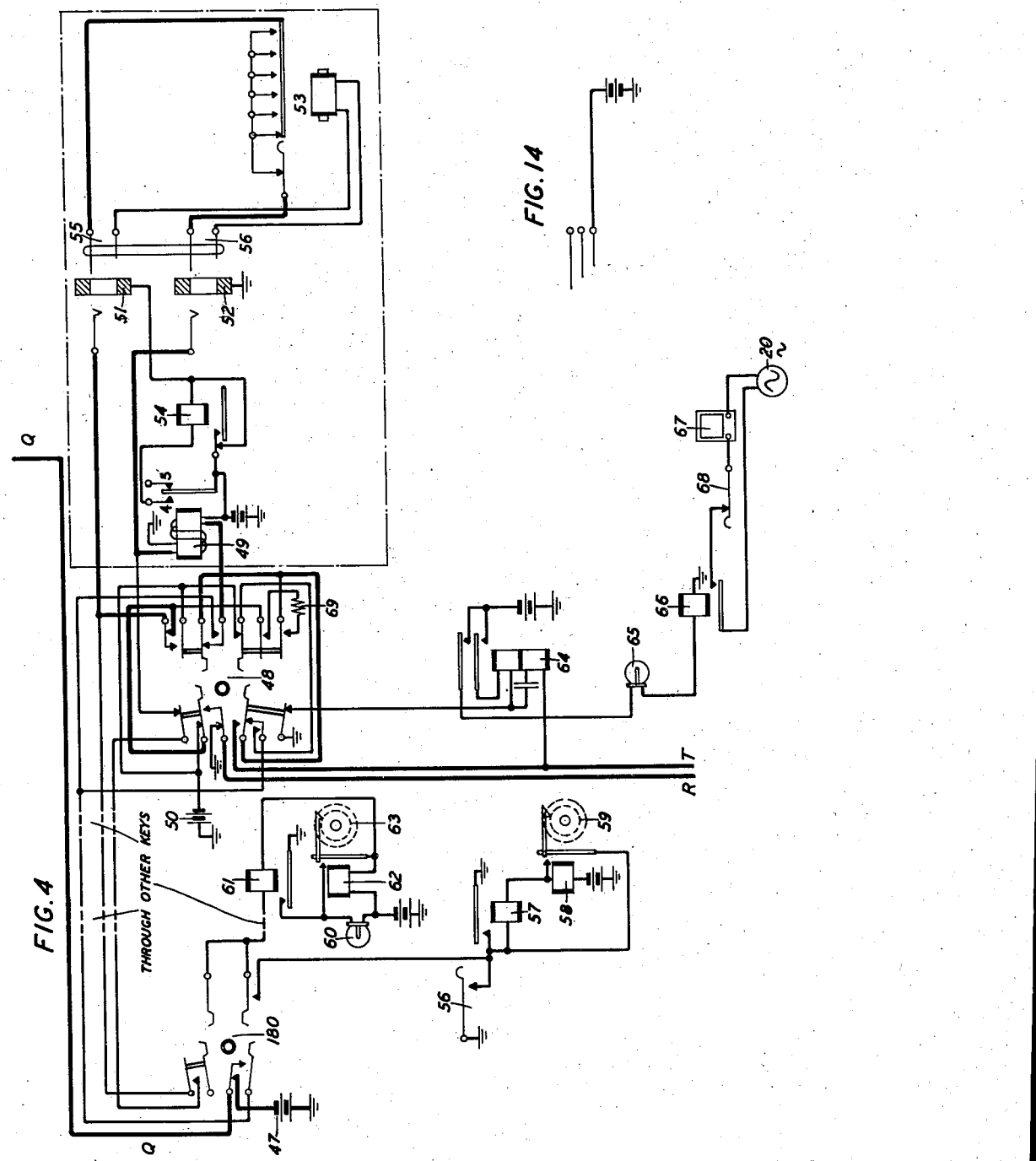
Fig. 4 illustrates schematically the supervisory operator's printing telegraph set and the peg count monitoring circuit.

Referring now to the circuit condition which exists when the operator is the first to answer the subscriber's signal and is thereby connected with her set in series with the tip of the answering cord, a circuit is traced from negative battery in the supervisor operator's circuit over Q lead, Fig. 4, operator set, Fig. 3, tip of cord circuit, Fig. 2, line jack circuit, Fig. 1, lower make contact of relay 118, upper winding of relay 115, jack 111, tip of loop, flash key 106, make contact of relay 109, key 105, subscriber's printer set, one winding of relay 107, key 105, winding of relay 110, ring of loop, upper make contact of relay 118, lower winding of relay 115, contact of relay 117, jack 111, to positive battery 16. Communication may now take place between the operator and the subscriber. The operator operates the printer set of Fig. 3 to send the word "operator" or "opr," which is typed up on the receiving unit 100 of the subscriber's printer. The subscriber then answers by operating the sender unit 101 to transmit to the operator's printer set information regarding the called subscriber's line. The operator, having obtained the information (let us suppose) that the call is to a local subscriber to whom she has direct access, then connects plug 122 of the repeater cord in the called subscriber's line. Both the calling and the called subscribers have line jack circuits and subscriber's station circuits similar to Fig. 1. The insertion of plug 122 into jack 114 of the called subscriber's line causes the operation of relay 118 in the line jack circuit, Fig. 1, and the operation of relays 136 and 148 in the cord circuit on a path traced from battery through the windings of relays 148 and 136, in series, sleeve of calling plug 122, jack 114, through winding of relay 118, to ground. The operation of relay 136 releases the normally operated relay 147. Relay 147 is a slow release relay and a slight interval of time will elapse before it releases and closes the tip of the cord circuit through its contacts. The reason for this will be described in connection with a description of the toll line circuit. The release of relay 147 connects the tip of the calling plug 122 through upper make contact of relay 136, break contacts of relay 147, lower inner make contact of relay 136, break contact of relay 137, lower break contact of relay 138, make contact of relay 125, one winding each of relays 123 and 124, right side contact of split key 130, contact of conference jack 129, to negative 130 volt battery through M resistance. The tip of plug 122 completes a circuit through jack 114, Fig. 1, lower make contact of relay 118, upper winding of relay 115, contact of jack 111, tip of loop flash key 106, condenser 11, bell 104, key 105, break contact of relay 109, to ground 9. The operation of relay 118 in the line jack circuit will complete a circuit from positive battery 16, contact of jack 111, contact of relay 117, lower winding of relay 115, upper make contact of relay 118, ring of loop, winding of relay 110, key 105, one winding of relay 107, sending contacts 101, key 105, normal break contact 109 to ground 9, operating relay 115. The operation of relay 115 will operate relay 116, which in turn will operate relay 149 and light supervisory lamp 128 in the cord circuit on a path as follows: ground on the upper make contact of relay 116, through the winding of relay 117, ring of jack 114, ring of plug 122, key 150, upper inner break contact of relay 138, winding of relay 149 to negative 130 volt battery thus operating relay 149. The operation of relay 149, in turn, completes a circuit to light lamp 128 from ground on the upper inner make contact of relay 149 to battery through lamp 128. Relay 149 in operating applies ground from a lower make contact to the repeater circuit to keep the communication path closed. This ground is traced from a lower make contact of relay 149, through the contact of relay 125, one winding each of relays 123 and 124, key 130, contact of conference jack 129 to negative 130 volt battery. The operator now rings on the circuit by momentarily operating ringing key 151. This applies battery to the winding of the polarized relay 152 causing it to operate over key 150 and the ring side of the cord which, it has been shown, has ground applied to it from relay 116 in the line jack circuit. The operation of relay 152 energizes the primary winding of relay 138 on a circuit traced from ground on the contact of relay 152 to battery through the lower winding of relay 138 thereby operating relay 138. Relay 138 locks up from ·130 volt negative battery through its upper winding and its upper inner make contact to the ring side of plug 122 which has ground from relay 116. The operation of relay 138 releases relay 149 extinguishing the calling cord lamp 128. The operation of relay 138 also lights guard lamp 153 from battery on the upper outer make contact of relay 138 to ground through lamp 153. The same contact which lights the guard lamp 153 prepares a circuit for relay 137 to be operated from an interrupted ground 154. This interrupted ground 154 operates relay 137 at intervals. When relay 138 is operated and relay 137 not operated during an interval, negative 130 volt battery is applied to the tip of the calling cord, thence to the tip of the subscriber's line from 130 volt battery on the lower break contact of relay 137, lower inner make contact of relay 138, upper make contact of relay 137, lower inner make contact of relay 136, break contacts of relay 147, upper outer make contact of relay 136, tip of cord to ground in the subscriber's station over a path through his bell circuit as hereinbefore described. When relay 137 is operated, 20 cycle ringing current from the upper make contact of relay 137 is applied to the tip of the line to ring the subscriber's bell over a circuit traced from the upper inner contact of relay 137, lower inner make contact of relay 136, break contact of relay 147, upper outer make contact of relay 136, tip of cord 122 and out over the line to the subscriber's bell at the station. This alternate ringing will continue to be applied to the line until the subscriber answers. While the ringing is continuing, relay 115 in the line jack circuit will chatter, but to prevent this chattering from affecting the supervisory guard lamp 153 in the cord circuit, relay 116 is designed as a slow-release relay which will not release while relay 115 chatters. When the subscriber does answer by depressing the start key 102 at the station set, the same relays will operate at the station as described in connection with originating a call and ground will be removed from the ring of the loop circuit; the bell circuit over the tip side of the loop will be opened and T and R of the loop will be closed through the sending and receiving circuits of the subscriber's printer. In the line jack circuit the closure of the subscriber's loop will cause both windings of relay 115 to become energized and cause relay 115 to release for reasons hereinbefore described in connection with originating a call. The circuit which energizes the upper winding of relay 115 in the line jack circuit is traced from negative battery in the cord circuit on the lower armature and break contact of relay 137, when that relay releases in one of the interrupted intervals, through the lower inner make contact of relay 138, upper break contact of relay 137, contacts of relays 136 and 147 to the tip of plug 122 and out over the line circuit. The release of relay 115 will release relay 116 which will remove ground from the ring side of cord 122 and thus release relay 138 and extinguish guard lamp 153. The tip of the calling cord circuit is restored to the repeater circuit and communication may now take place between subscribers through the repeater with the operator's set monitoring on the circuit.

The called subscriber may acknowledge the call in some way, as by typing his code number on his printer. This will be received on the printer sets of both the operator and the calling subscriber. The operator monitors on this connection until the parties are in satisfactory communication and then disconnects her set from the circuit by restoring key 196 associated with the cord circuit to its normal position from its operated "home" position, thus leaving her set free to answer other calls. The circuit which previously was traced from the "M" lead of the cord circuit through the operator's circuit now is traced through the lower left and lower right side normally made contacts of key 196 to negative battery through resistance AA in the cord circuit.

When the call is completed a disconnect signal may be sent by the subscriber by pressing stop key 103 which opens the locking circuit for relay 108, causing it to release and thereby open the circuit of the power supply to the printer motor. Relay 109 will also release and the subscriber's station will return to normal and restore the condition of an open tip and grounded ring. Relay 115 in the line jack circuit will now reoperate since the ring winding only of the relay will be energized. Relay 116 will now operate from the contact of relay 115 to apply a ground to the ring of jack 114 and to the cord circuit. In the case of a calling cord, relay 149 will operate and place a ground from its upper inner make contact to light the supervisory lamp 128. In the case of an answering cord, a circuit is traced from ground on the ring of cord 121, normal break contacts of key 155, one winding of relay 156, winding of relay 157 to battery, operating relays 156 and 157. Relay 157 completes a circuit to light supervisory lamp 158 from battery through the lamp, upper make contact of relay 157, contacts of key 155 to ground on the ring of plug 121. The operation of relay 156 closes the answering side of the repeater from ground on its lower make contact. The operator, upon noting the lighted lamps, disconnects the repeater cord from the jacks of the calling and called subscriber's lines thus restoring all equipment to normal.

It should be noted that if the subscriber's printer set is of certain well known types in common use, the subscriber may send a disconnect signal to shut down not only her own set but also the distant subscriber's set by sending two shift signals on her printer equipment. Certain mechanism located in the subscriber's printer (not shown in the drawings since the printer forms no part of this invention) acts to open the motor control contacts. The opening of the motor control contacts releases relay 108 and has the same effect as opening the stop key 103.

*Trunk circuit connection*

The establishment of a trunk circuit connection is somewhat different from that outlined above for a local connection. By reference to Fig. 8, it will be seen that a trunk circuit connection is one of the type indicated for connection of a station C at central office A and a station C at central office B. The stations desiring connection have loop circuits terminating in different central offices, so that a trunk circuit is required for completing the connection between stations.

The connecting cord used for establishing a connection of this type is shown in Fig. 2 and is the same type as that previously discussed.

Figure 5:
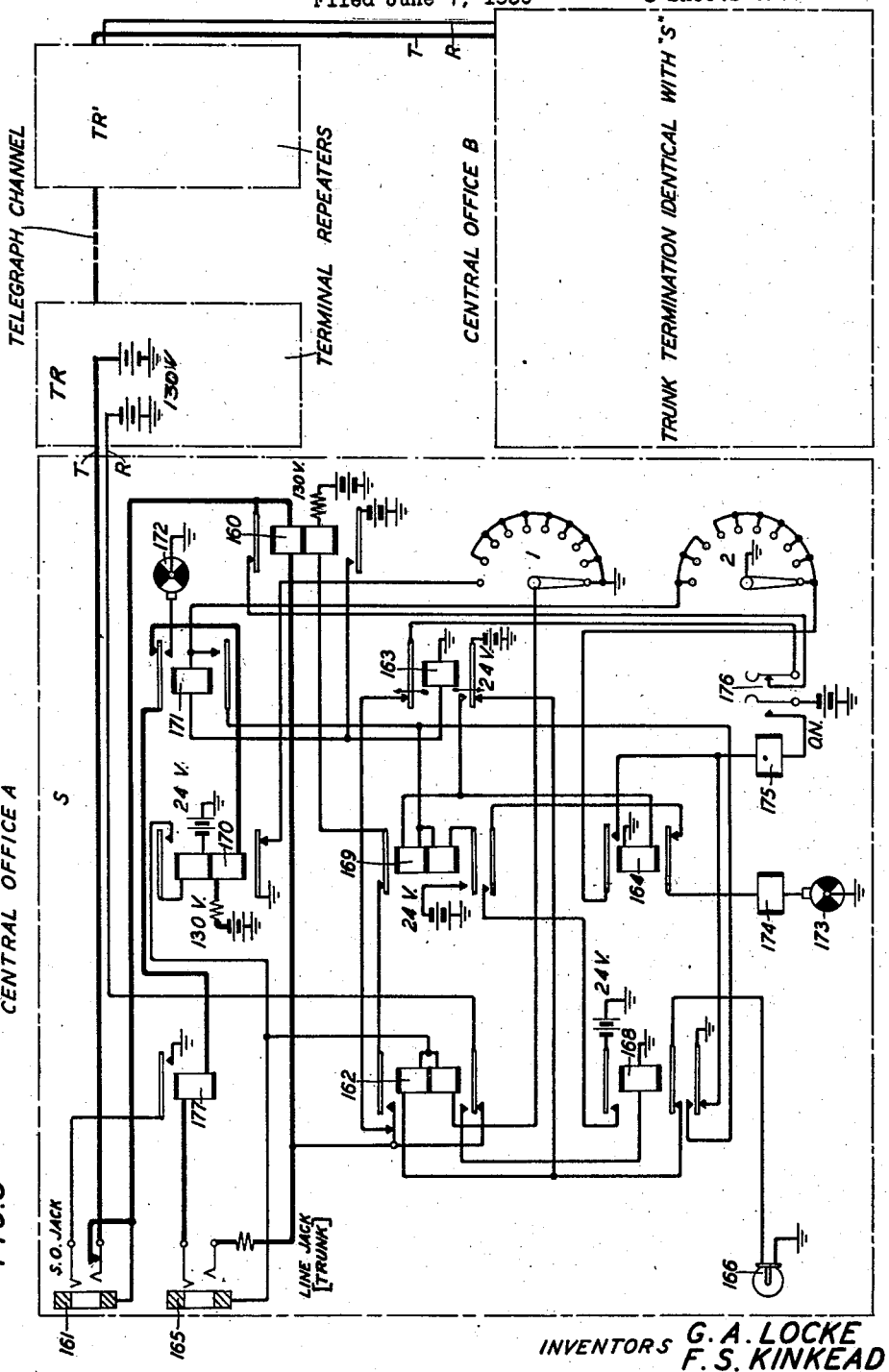
Fig. 5 shows the circuit diagram of the toll line trunk circuit used in connecting two distant central offices.
Figure 6:
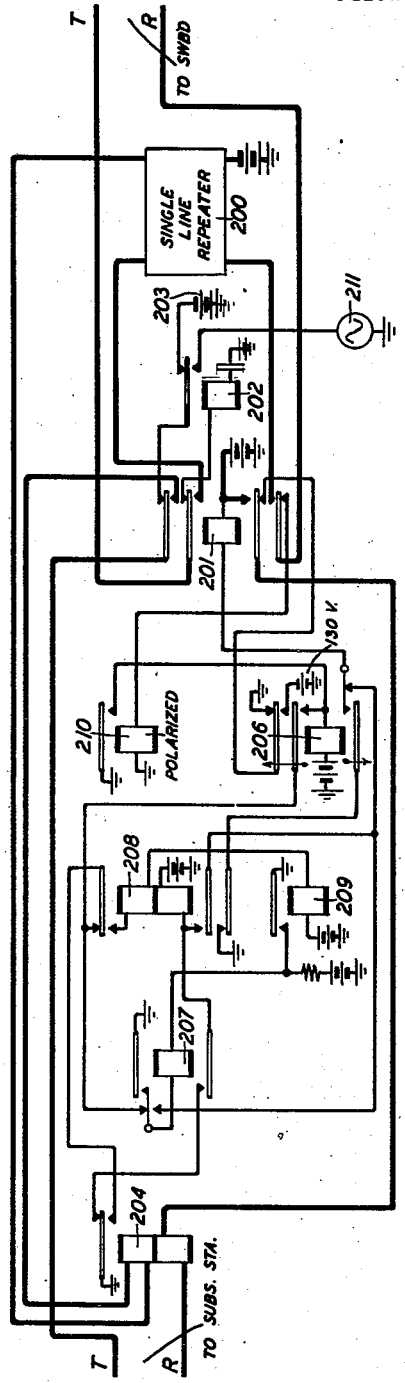

The circuit connection of one termination of a trunk circuit is shown in Fig. 5. It is only necessary to show the termination of the trunk circuit at one central office since it is identically terminated at each office between which it extends.

Referring to the drawing of Fig. 5 it will be noted that the equipment in box "S" is novel to the present invention whereas the terminal repeater units TR and TR' (Fig. 4) comprise standard telegraph equipment which, of itself, is known in the art. As illustrated, a telegraph channel connects both terminal repeaters, each of the latter in turn being connected to central offices A and B. The repeater unit may be of a known type such as disclosed in U. S. Patent 1,479,430, to J. M. Fell, dated January 1, 1924. Several repeaters may be used in tandem between the terminal repeater stations. Such case may occur when the length of line is very long. It is understood, of course, that metallic, open wire differential duplex, two way polar, or carrier telegraph repeaters may be used. U. S. Patent 1,469,259 to B. P. Hamilton October 2, 1923, discloses a carrier telegraph arrangement which may be used in this circuit.

The call is initiated in the same manner as previously described for a local connection. Referring to Fig. 1 the calling subscriber presses start key 102 to start the printer set motor at the calling station, and to signal the central office. The operator at the central office responds by connecting her set to the jack of the calling subscriber's line through a cord circuit and obtains the necessary information in regard to the called station.

It is to be noted, at this time, that relay 160 of the toll line terminating equipment is normally operated on a circuit from positive battery in the telegraph repeater over the tip of the circuit, then through the contact of service observing jack 161, upper winding of relay 160, lower break contact of relay 162, back over the ring of the circuit to negative battery at the repeater. Relay 160, in turn, operates relay 163 from battery on the lower make contact of relay 160 to ground through the winding of relay 163. Relay 164 is also operated on a circuit from battery on the lower make contact of relay 163 to ground through the winding of relay 164. Relays 160, 163 and 164 are, therefore, normally held up.

After the operator has received the number of the called subscriber and learned that it is necessary to complete the call over a toll line, she inserts the calling cord into a toll line jack indicated as idle by the idle line indicator. The idle line indicator is a circuit well known in the telephone art and is, therefore, not shown on the drawings, since those skilled in the art should readily understand its application to the circuits disclosed. When calling plug 122 of the cord circuit is inserted in jack 165 a circuit is completed from ground on bank 1 of the selector wiper 1, through one winding of relay 162, sleeve of jack 165, over the sleeve of plug 122, through windings of relays 136 and 148 in the cord circuit, to operate relays 136 and 148 in the cord circuit and relay 162 in the toll line circuit. Relay 168 will then operate on a circuit from battery on the lead R of the repeater TR, lower make contact of relay 162 to ground through the winding of relay 168. As heretofore described, in connection with a local call, relay 136 in the cord circuit, in operating, releases relay 147. Relay 147 is designed to be slow in releasing and a short interval of time of the order of slightly less than one second will elapse before the relay finally releases and closes the tip of the cord through to the repeater circuit TR. The interval of time during which the tip is kept open by slow release relay 147 is utilized to cause a calling signal on the toll line which is automatically given when a calling plug is inserted in a line jack. The open tip caused by the insertion of plug 122 causes relay 160 in the toll circuit at the distant central office "B" to release which in turn releases relay 163. The release of relay 163 also releases relay 164 at office "B." Relay 163 is designed as a slow release relay and the interval of time during which the tip of the cord circuit is kept open is made just long enough to allow relay 163 to release. The release of relays 160 and 163 at "B" will prepare a locking down circuit for relay 160 which may be traced from one side of the upper winding of relay 160 through the upper back contact of relay 168, upper back contact of relay 163, upper normal back contacts of relay 162 to the other side of the upper winding of relay 160. Relay 163 in releasing lights lamp 166 from battery on the lower break contact of relay 163 through the lower break contact of relay 168 to ground through lamp 166, thus lighting the line lamp at office "B" indicating to the operator at that office that office "A" is calling. The battery which lights line lamp 166 is also used to make the sleeve of the line jack 165 busy through the secondary winding of relay 162. The upper and lower windings of relay 162 are connected in opposition to prevent the operation of the relay on a circuit from ground on selector 1. Relay 163 as heretofore mentioned, is a slow release relay so designed that slight pulses on the toll line will not give a false call, also that it will not be affected by printer signals or by a momentary withdrawal of the plug from the toll line jack.

The operator at central office "B" answers the call by inserting the answering plug of a cord circuit into the jack. Battery is present on the sleeve of the plug and on the ring of the plug while the tip of the plug is connected to ground through the winding of busy test relay 178. The insertion of the answering cord operates relay 162 in the toll line circuit from battery on the sleeve of the cord, through the winding of relay 162 to ground on selector 1. Sleeve relays 134 and 133 in the cord circuit also operate and apply negative battery to the tip of the cord. The operation of relay 162 will open the short circuit around the primary winding of relay 160 and will complete a circuit to cause current to flow through the secondary winding of relay 160. Relay 160 will not operate at this time, since its windings are differentially connected and the flow of current in the primary and secondary windings act to oppose one another. The operation of relay 162 causes the operation of relay 168 on a circuit from negative battery over the ring from the repeater TR, lower make contact of relay 162 to ground through the winding of relay 168. The operation of relay 168 extinguishes lamp 166 by opening its lighting circuit. The operator at "B" then answers from her printer. These printer signals will not affect relay 160 since fluctuations in current due to the signals passing through both windings of relay 160 will affect the windings equally thus keeping the relay unoperated. When, however, the operator at office "A" replies, the circuit through the primary winding of relay 160 will be opened while current will still flow in the secondary winding of relay 160, thus causing the operation of relay 160 at office B. Relay 160, in turn, operates relay 163 which applies battery to operate relay 164. A circuit is now closed to operate relay 169 from battery on the lower make contact of relay 163, primary winding of relay 169 to ground on the lower outer make contact of relay 168, thus operating relay 169 and locking it up over battery through its lower inner make contact and secondary winding. The operation of relay 169 opens the circuit through the secondary winding of relay 160 allowing relay 160 to follow the printer signals. Relays 163 and 164 will remain operated during the printer interval due to the slow release feature of relay 163.

Incidentally, at this point, it is well to bring out the fact that the insertion of the calling plug at originating office "A" causes the operation of relays 162 and 168 at "A" as hereinbefore described. The open tip caused by the slow release relay 147 in the cord circuit opens the operating path for relay 160 at the originating office "A" and relay 160 will release. However, since relay 163 is a slow release relay, a path is closed to operate relay 169, before relay 163 finally releases, on a circuit from battery on the lower break contacts of relay 163, winding of relay 169 to ground on lower outer make contact of relay 168. Relay 169 locks up over its own lower inner make contact. Relay 163 then finally releases and releases relay 164.

When slow release relay 147 in the cord circuit finally releases, the tip of the cord is closed through and relay 160 reoperates, in turn, causing the reoperation of relays 163 and 164. The remaining details of the toll line circuit follow in manner identical with that outlined for office "B."

It will be noted that if the operator at "B" removes her plug from the incoming trunk line circuit before receiving signals from office "A" that lamp 166 at office "B" will not be extinguished but will relight as an indication to the operator at "B" that the incoming call has not been answered. Upon reception of signals over the trunk from "A," lamp 166 at "B" will be extinguished as described hereinbefore. The operator at central office B may then proceed in a similar manner to extend the call to central office C if the call is intended for a subscriber to be reached over central office C rather than for one to be reached directly from central office B.

There is another signal transmitted over the toll line different from the calling signal, and that is the disconnect signal. There are, however, two ways of restoring a trunk circuit to normal.

If the connection is set up as previously described, an operator may simly pull her cord out of the toll line jack. This releases relay 162 in the toll circuit which restores the ring circuit to the tip, releases relay 168, which in turn releases relay 169. Relays 160, 163 and 164 remain operated. In accordance with this mode of operation the operator takes cognizance of a single lighted lamp as an indication to disconnect a toll circuit.

This manner of restoring a trunk circuit to normal is convenient and simple whenever a communication path is established over a single trunk circuit between two terminating central offices. However, if a built up communication circuit is established through several central offices and over several trunk circuits the operator at the through or intermediate office will not receive any disconnect indication whenever an operator at a terminating office simply pulls her cord out of the toll line jack. A ten-second disconnect signal is therefore provided for indicating to the operator at the through or intermediate office that a subscriber has disconnected.

To send a ten second disconnect signal the operator at the central office which receives the calling subscribers disconnect signal depresses non-locking key 151 in the cord circuit which is connected to the toll line jack. This disconnect signal will automatically appear on all offices connected to the communication circuit. The operation of the non-locking key will apply 24 volt negative battery to the ring side of plug 122. Current now flows over the ring side of plug 122 which could not flow before because negative 130 volt battery was applied to both ends of the circuit. Relay 170 will therefore operate on circuit from 130 volt battery through its secondary winding, upper normal break contact of relay 171, through the winding of relay 177 to 24 volt negative battery on the ring of the plug. Relay 170 will lock up over its primary winding and upper make contact to ground on selector 1 through the winding of relay 162. The operation of relay 170 will remove the ground from its lower break contact from the tenth contact of selector bank 1. The operator will now remove the plug from the toll line jack circuit. Relays 160, 163 and 164 will release since the removal of the plug opens the tip of the toll line circuit and releases relay 160 and relay 170. Relays 162, 168 and 169 will remain operated. A circuit is now closed for rotary magnet 174 through the break contact of relay 164, make contacts of relays 169 and 168 to battery. Rotary magnet 174 will be stepped around by interrupted ground 173 at the rate of one step per second, which is the rate of interruption for 173. When the wiper of selector 1 reaches the tenth contact the operating circuit for relays 162 and 170, which was heretofore closed, will now be opened, thus causing their release, in turn releasing relays 168 and 169. When relay 162 releases, battery over the tip of the loop from the repeater TR is reapplied to relay 160 causing it to operate, in turn, operating relays 163 and 164. Relay 168, in releasing, applies ground from its lower outer break contact through the winding of "release relay" 175 to battery through off-normal contacts 176, the left contacts of which have been closed and the right contacts opened due to the selector being off-normal. The selector will now return to normal. The circuit has, therefore, been opened for 10 seconds and then closed.

It will be noted that the ten second disconnect signal may be transmitted over the answering cord also, by depressing non-locking key 155 in the answering side of the cord circuit whenever the answering plug is inserted in the toll line trunk circuit. This applies a 24-volt battery to the ring of the answering plug. Key 155 however, will not be used for this purpose in the circuit description herein described.

The above description of the disconnect feature applies to the transmission of the disconnect signal. The reception of a disconnect signal over the toll line is somewhat different.

To receive a disconnect signal, assume that the line is opened at the distant end by the depression of the non-locking key and the removal of the plug from the trunk circuit. At the near end relays 160, 163 and 164 will release but relays 162, 168 and 169 will remain operated because the plug at the near end is still in the toll line jack. Rotary magnet 174 will now function as hereinbefore described and will advance the selector. When the position of the wiper on bank 2 reaches the eighth point it will apply ground to relay 171. When the wiper on bank 1 of selector reaches the tenth point, the ground for the winding of relay 162 will then be obtained from the lower break contact of relay 170 through the wiper of bank 1. The selector will remain this way until the line closes. When the line does close relays 160, 163 and 164 will operate. Relay 160 in operating will operate relay 171 from battery on its lower make contact through the winding of relay 171 to ground on bank 2. In operating, relay 171 will lock up on its lower make contact to ground from the lower outer make contact of relay 168. Relay 171 in operating transfers the ring circuit of the plug, which traces a path through line jack 165 and the winding of relay 177, to interrupted ground 172 on the upper inner make contact of relay 171. This circuit will flash the lamp in the cord circuit over the ring of jack 165 at the rate of 60 flashes per minute. The circuit for the flashing lamp is traced from interrupted ground 172 in the toll circuit, ring of calling plug 122 (assuming that plug 122 is in jack 165 which will occur at the calling office) key 155, upper break contact of relay 133, through the winding of relay 149 to battery, operating relay 149 at intervals. Relay 149 applies ground from its upper inner make contact to light lamp 128 whenever relay 149 operates. In answering plug 121 is inserted in the toll line jack instead of plug 122, as at the called office, the interrupted ground will trace a path over the ring of cord 121, key 155, one winding of relay 156, winding of relay 157 to battery operating relays 156 and 157. Relay 156 will lock up on a circuit traced from negative 130 volt battery, lead T, normal contacts of operator's key 196, lead N, lower inner make contacts of relay 156, one winding of relay 156 to ground on the upper inner make contact of relay 133. The operation of relay 157 connects supervisory lamp 158 to the ring circuit through the upper make contact of relay 157, lighting lamp 158. When the interrupted ground 172 from the toll circuit flashes off for a slight interval, relay 157 will release and then lock down on a path traced from 130 volt negative battery on the upper inner make contact of relay 156, lower inner break contact of relay 157 through the winding of relay 157 to 130 volt negative battery on the other side of the winding. Lamp 158 will then be connected to an interrupted ground 179 which will flash 0.5 second on 0.5 second off on a path traced from the upper outer make contact of relay 156, upper outer break contact of relay 157 to battery through lamp 158. In the case of the answering plug, the flashing will originate in the cord circuit while in the case of the calling plug, the flashing originates in the toll line circuit and is transmitted to the cord lamp through the ring of the jack and plug.

Conference connection

Various features which are incorporated in the design of this telegraph system and which were not described in connection with a communication circuit built up between local or toll subscribers will now be taken up in detail.

As was mentioned before, it is possible with the exchange system disclosed herein to establish connections which are common to more than two subscribers' stations. Such connections are termed "conference connections."

Conference connections may be established which involve any number of stations, local as well as distant stations. In such a case connections are extended over trunk circuits from the distant stations to the nearest office at which the local stations terminate and the plurality of stations are interconnected in a common communication circuit at such office. Finally, conference connections may be established involving distant stations only. For this case individual trunk circuit connections are extended from a plurality of stations to an intermediate office distant from all the stations, and the various lines are interconnected at such intermediate office.

Conference connections of either type mentioned above may be established by inserting the "answering" plug of an idle cord circuit into conference jack 129 of any cord circuit connected to a communication circuit. The calling plug of this idle cord may then be inserted into the line of the party who desires to be added to the communication circuit. In this manner, any number of idle cords may be utilized to add any number of additional parties by inserting the answering plug of an idle cord into a conference jack of any cord interconnected to the communication circuit (either the original cord circuit or the added cord circuit) and then connecting the calling plug of this idle cord to the line jack of another subscriber or trunk circuit connected to another subscriber.

The insertion of the answering plug of another cord circuit into conference jack 129 connects the tip circuit of the added cord in series with the tip of the first cord circuit. Relay 133 of the second cord will operate from ground on the sleeve of the conference jack of the first cord. Negative 130 volt battery is thus taken off the tip of the first conference jack 129 and negative battery for the first cord repeater is supplied from the second cord through the tip of the second cord over the operated contacts of relay 133 in the second cord, contact of relay 139, contact of relay 123, windings of relays 125 and 126 to negative 130 volt battery over the M lead, key 196 and S lead of the second cord. This action will then place the calling side of the first repeater in series with the answering side of the second repeater. Communication may then take place between all established connections through the repeater circuits of all cords. The ring circuit of the conference jack is so arranged that if there is a disconnection on both answering and calling sides of the first cord circuit the cord lamp will light in the second cord circuit. This circuit is traced from ground over the lower outer make contacts of relays 149 and 157 in the first cord circuit to the ring of the conference jack 129, thence to the ring of the answering plug inserted into jack 129. In this manner any number of disconnect signals may be lit in the answering plug circuit of the added cord circuits provided that a double disconnect signal is received in the cord circuit of the one into which the added cord is inserted.

*Split key feature*

Key 130 is provided in the cord circuit to enable an operator to connect her telegraph printer set in communication with either the calling side of the cord circuit or the answering side of the cord circuit but not with both, thus making the answering cord and the calling cord two individual circuits. Key 130 when thrown in either direction places a short circuit on the contacts of relays 123 and 125 through the lower portion of the key arrangement. The operator's printer is normally in the answering plug side of the cord circuit and the conference jack in the calling plug side of the cord circuit. When key 130 is thrown to the answering position the operator's printer remains unchanged in the answering plug side of the cord circuit over a path traced from the M lead through the upper break contacts on the calling side of key 130 and out to the tip of the answering cord through the windings of relays 126 and 125, short circuit on key 130, and the tip of the answering plug through contacts on relays 139 and 133. The short circuit caused by the operation of key 130 is to prevent the subscriber on the calling side from interfering with communication between the operator and the subscriber connected to the answering plug which might occur if the calling subscriber operates his printer or sends a disconnect signal. Since the contacts of both relays 123 and 125 are short circuited by the operation of key 130, signals cannot be transmitted through the repeater in the cord circuit but must be transmitted over a direct circuit connection to the subscriber.

Now if key 130 is thrown to the calling position the printer 188 is placed in the calling side of the cord circuit and the tip side of the conference jack 129 is transferred to the answering side of the cord circuit. Similarly, the contacts of both relays 123 and 125 are again short circuited so that the subscriber in the answering side of the cord cannot interfere with the signals transmitted between the operator's printer and the subscriber in the calling side of the line. The operator's path is now traced from the M lead, make contacts on the calling side of key 130, windings of relays 124 and 123, short circuit in key 130 and out over the tip of the calling cord through the contacts of relays 138, 137, 136 and 147.

*Printer key*

The purpose of a printer key is to connect the operator's printer set to the cord circuit. The key may be provided to permit an operator on a position adjacent to the one in which the cord is located to connect her set to that particular cord. This feature is often desirable when an operator on a very busy position has used up all the cords in her position to connect subscribers and has need for more cords to answer other subscribers, or when an operator on a position has been relieved from work, the operator on the adjacent position can thereby monitor in on some of the cords of the vacant position. The team keys are so arranged that an operator may only team in on not more than half the keys on an adjacent position. The rest of the keys in that adjacent position are arranged for teaming into another position.

A printer key is associated with each cord circuit. This key may or may not have two positions. For a cord circuit which is associated only with one position the "home" position only is used. Other cords, usually the cords located at both ends of an operator's printer position, are arranged so that they can be used in either the "home" position or on the adjacent position nearest that cord. Where a key is adapted to be used for two positions a "team" side of the printer is provided for association with the adjacent operator's printer set. The printer keys in a position are connected in series with make before break contacts, and are so arranged that in a normal position the cord circuit terminates to battery through leads connecting the cord circuit to the keys.

The details of the circuit condition involved in connecting operator's printer set 188, Fig. 3, to the cord circuit associated with key 196 by throwing key 196 to the "home" position were described in connection with the building up of a local connection. Assuming that the operator in the position adjacent to printer set 188 and to the right of it desires to answer the subscriber's call over the cord circuit associated with key 196, then operator 189 will throw key 196 to the "team" position. This action will connect the M lead of the cord circuit associated with key 196 with the A lead of operator's printer set 189, and will also connect the P lead with the B lead of printer set 189 over the right hand contacts of key 196. Leads R, S and T will not be affected since both sides of the key are identical in arrangement in regard to these leads. Operator 189 may now answer the subscriber in the same manner as described in connection with a local subscriber. Similarly, operator 188 may answer a call on the cord associated with key 194 on the adjacent left position by throwing key 194 to the right or "team" position.

Operator's printer set 188 may also be used to answer a call on its adjacent right position by throwing key 197 to the team position. This will connect the A and B leads of printer set 188 over a loop arrangement involving keys 194, 195, 196 and 197 in series to the M and P leads of the cord circuit associated with key 197.

Key 195 located in the local position may only be used to connect the local operator's printer set, in this case set 188, to its associated cord circuit, since the "team" feature is not wired into that particular key. Each position may thus be equipped with cord circuits having both the "home" and "team" features or the "home" feature only as considered desirable.

In accordance with the principles underlying this feature of the invention, the A and B leads of a printer set are wired only to answer calls on several cords on an adjacent position and not all the cords on the adjacent position, otherwise the A and B leads of the various printer sets would be interconnected.

If two keys on one position are thrown at the same time to either the "home" position or the "team" position, the key to the left only will be connected to the printer set while the key to the right will simply be closed through to battery and not interfere with the printer set or the line circuit to which the left key is connected. This is illustrated in the drawing of Fig. 3 for the "home" conditions only. Assuming that keys 195 and 196 are both thrown at the same time to the "home" position, the cord circuit associated with key 195 will be connected to the printer set while the M lead of key 196 will be connected to battery over the contacts of key 195 to the S lead of the cord circuit associated with key 195. Since these same principles apply to the "team" condition it is not considered necessary to illustrate this condition in the drawings and so multiply the number of figures necessary to illustrate this invention.

Non-interference feature

The non-interference feature is incorporated in the cord circuit and permits only the first of several operators inserting a cord in a line jack circuit to obtain proper connection with the subscriber. Returning now to the circuit condition when an operator inserts her answering plug 121 into a line jack to answer a calling subscriber, a circuit is completed from ground in the line jack circuit through the 200 ohm winding of relay 118, sleeve of jack 114 and plug 121, 80 ohm winding of relay 134, lower break contact of relay 133, winding of relay 132 through a 1000 ohm resistance to a potentiometer made up of resistances A and B of 65 ohms and 135 ohms respectively. If this cord is the first to complete the sleeve circuit, then the point of the potentiometer will be negative with respect to the sleeve due to negative battery 131. Relay 134 will therefore operate and lock up through its secondary 3.5 ohm winding as hereinbefore described. If another cord has preceded this particular cord into the multiple of the calling line, relays 134, 133 and 135 of the first cord will be connected to the sleeve circuit and operated. The sleeve of the first cord will then be connected to a 24 volt battery through the 3.5 ohm secondary winding of relay 134, in series with the 50 ohm winding of relay 133 and the 2.5 ohm winding of relay 135 making a total of 56.0 ohms. Therefore, the sleeve of the line jack will be at a more negative potential than the sleeve of the plug of the second cord, i. e., the potentiometer of the second cord will be positive with respect to the sleeve, and relay 134 in the second cord circuit will not operate. It is to be understood, of course, that relay 132 in the sleeve of the cord circuit always operates upon insertion of the cord in the line jack for the purpose of indicating a special busy condition to the operator. This feature was described in connection with a communication circuit between local subscribers.

The purpose of supplying negative battery to the sleeve of jack 114 in the line jack circuit and the sleeve of jack 165 in the toll line circuit is to make the circuit busy for operators who desire to use the line at a multiple position where an incoming signal is not provided. This feature will be described subsequently.

Busy test and out of order busy

The purpose of this feature is to provide a visible indication to the operator that a line is busy either due to regular operation or due to the presence of an "out of order" busy cord.

The sleeves of all jacks in operation may have battery applied to the circuit from any of the following sources; the sleeve of a cord circuit, battery from the lower make contact of relay 119 in the line jack circuit, battery on the break contact of relay 163 in the toll line circuit as previously described, or positive battery from the presence of an "out of order" busy cord.

Before the operator inserts her cord into a called subscriber's line or into a toll line circuit she will touch the tip of the plug to the sleeve of the jack. The negative battery present on the sleeve of a line in operation will operate relay 178 (which is polarized to be operated by negative current only) in the cord circuit on a circuit traced from ground through the winding of relay 178 through the tip of either the answering or calling plug to the sleeve of the jack. In operating relay 178 will apply ground to light lamp 127 as an indication to the operator that the line is busy.

If a line is out of order, an "out of order" busy cord as illustrated in Fig. 14 will be plugged up in a multiple appearance of that line. This cord will supply positive battery to the sleeves of the jacks of that line. When the operator touches the tip of the plug to the sleeve of the jack relay 181 (which is polarized to be operated by positive current only) will operate from ground through the winding of relay 181 to positive battery on the sleeve of the jack. Relay 181, in operating, will operate relay 182 and light lamp 127 on a circuit from ground on the make contact of relay 181, through the winding of relay 182 to battery through lamp 127. The operation of relay 182 will close a circuit to vibrate a sounder or buzzer 183 from a 20 cycle generator supply 184 through the buzzer to ground on the make contact of relay 182.

If a cord is plugged into an open line and the operator's key associated with that cord thrown a circuit will be closed which will operate relay 145. This circuit is traced from battery through the winding of relay 145, K lead, make contact of relay 143, make contact of key 196, P lead to ground on the make contact of relay 132. The operation of the last circuit was described in connection with a local subscriber's call. The operation of relay 145 will light lamp 127 indicating that the operator's set is in an open line circuit.

It will be noted that the tip of a plug will be disconnected from the busy circuit upon operation of the sleeve relay in the cord circuit whenever that plug is inserted into a line jack.

Flashing recall

A subscriber often has occasion to signal an operator after a connection has been established with the operator or with another subscriber. For this purpose flash key 106 is provided in the subscriber's equipment at his station.

Returning now to the circuit condition which exists when a subscriber is in communication with another subscriber, let us assume that a subscriber wishes to signal the operator to initiate another call. Non-locking flash key 106 at the sub-set is pressed once. This action opens the tip of the loop to the central office and places ground on the ring of the loop to energize only one winding of relay 115 in the line jack circuit and cause it to operate. Relay 115 in turn operates relay 116. As the upper armature of relay 116 is now connected to the ring of jack 114 through the winding of polarized relay 117, the closure of the upper armature will connect ground to the ring of the plug inserted in jack 114. Assuming that an answering plug 121 is inserted in jack 114 a circuit is completed through relays 156 and 157 in the cord circuit causing them to operate from ground on the ring of plug 121, contacts of key 155, upper winding of relay 156, winding of relay 157 to negative 130 volt battery. Relay 156 locks up to ground from the upper inner make contact of relay 133, lower winding of relay 156, lower inner make contact of relay 156 to 130 volt battery through key 196 over the N and T leads. Relay 156, in operating, applies ground to the answering side of the repeater holding the balance of the cord circuit closed from its lower outer make contact, contact of relay 123 and windings of relays 125 and 126 to battery over the M and S leads. Relay 157, in operating, connects lamp 158 to the ring of the plug, lighting lamp 158. The release of flashing key 106 closes the loop and removes ground from the ring, releasing relay 157 which locks in a released condition due to the application of negative 130 volt battery to the other side of its winding from its lower inner break contact and the upper inner make contact of relay 156. The answering lamp 158 is now connected to interrupted ground 179 which flashes the lamp at the rate of 0.5 second on and 0.5 second off until the plug is pulled down or the operator throws key 196 to monitor in on the circuit thus releasing relay 156.

Assuming that calling plug 122 is in jack 114 and that the called subscriber flashes key 106, then the ground on the ring of jack 114 from relay 116 is applied to the ring of plug 122 then to the normal contacts of key 150, upper inner break contact of relay 138 to battery through the winding of relay 149 operating relay 149. In operating, relay 149 applies ground from its upper inner make contact to light lamp 128. Lamp 128 will only flash in accordance with the operations of flashing 106 at the called local subscriber's set.

If a subscriber is connected through a toll line circuit then the operation of key 106 at the subscriber's station will cause an interrupted ground to be applied to the ring of the jack and plug and will operate relays 156 and 157 or relay 149 depending upon the cord involved as hereinbefore described.

Unattended station

If the operator at the central office rings a subscriber and the subscriber does not answer the operator may start the subscriber's set and allow the calling subscriber to send a message to the unattended station. This is done by the operator pressing key 150 in the calling side of the cord circuit which applies positive 130 volt battery to the ring of plug 122. It will be noted that upon insertion of plug 122 in the line jack of the called party that relay 118 in the sleeve of the line jack circuit is operated. Also, that relay 115 operated from positive battery 16 through one winding of relay 115 to ground on the ring of the subscriber's loop. Relay 115, in turn, operates relay 116. Therefore, the application of 130 volt positive battery to the ring of the cord circuit will complete a path to operate polarized relay 117 in the line jack circuit. This path is traced from ground on the upper make contact of relay 116 through the winding of relay 117 to the ring of jack 114. Relay 117 is a polarized relay and the direction of current flow is usually such as to keep it unoperated. The operation of relay 117 will apply negative battery 12 from its lower make contact to the ring of the subscriber's loop instead of the usual positive battery 16. The reversal of polarity on the ring side of the loop operates polar relay 110 at the subscriber's station which, in operating, closes the circuit of relay 108 in the same manner as does start key 102 where pressed, and puts the station in an operating condition. The motor for the printer set is thus started and the unattended station key 150 at the central office may be released. The subscriber's loop T and R will now be closed through the subscribers station set, relay 115 in the line jack circuit will release, and line lamp 128 in the cord circuit will be extinguished. The extinguishment of lamp 128, after the release of key 150, makes known to the operator the fact that the unattended subscriber's motor for the printer set has started. If the lamp 128 does not remain extinguished after the operator has released key 150, it will be an indication to the operator that the subscriber's loop has not been closed through the station circuit. Key 150 will then be reoperated.

Ringing on the answering cord

When a subscriber's station is in the disconnected position and it is desired to ring on the answering plug over the subscriber's line jack the answering ringing key 155 is depressed. This introduces relay 139 into the ring circuit and causes it to operate on a circuit traced from 24 volt negative battery from the lower contact of key 155, winding of relay 139 to ground on the ring of plug 121 and jack of the line. The operation of relay 139 will apply ringing current from source 39 through the upper make contacts of relay 139 and the make contacts of relay 133 to the tip of the plug and out to ring the bell at the subscriber's station. Key 155 while depressed applies ground from its upper make contact to the answering side of the cord repeater holding the balance of the circuit closed.

It will be noted that the ringing on the answering plug is caused by continual manual operation of key 155 while that on the calling plug is automatic after only one operation of key 151.

Cord cut-off alarm circuit

The purpose of this feature is to provide a visible and audible signal when a cord is removed from a communication circuit before a disconnect signal is received.

Referring again to the circuit condition in the cord circuit which exists when communication is taking place between two subscribers, it will be noted that relays 148, 136, 135, and 133 are operated and that relay 149 is unoperated. With key 196 thrown, which occurs when the operator first monitors in on the circuit, a path is completed to operate relay 40 from ground on the upper make contact of relay 135, through the upper make contact of relay 148, secondary winding of relay 40 to 130 volt negative battery over leads R and T and key 196. Relay 40, in operating, will lock up through its primary winding on a path from ground on the upper inner make contacts of relays 133 and 136 (or either of the relays if only one cord is inserted in a jack) upper make contact of relay 40, primary winding, upper outer break contact of relay 149 to battery on upper inner break contact of relay 156. Now, if one or both cords are pulled down by mistake either or both the 135 and 148 relays will release. Consequently, a circuit will be closed to operate relay 41 from battery through either lamp 158 or 128 depending upon which cord is pulled down, the lower break contacts of either relay 135 or 148, the lower make contact of relay 40 to ground through the winding of relay 41. In operating, relay 41 will open the operating path of relay 42 thus releasing relay 42 which is normally held operated through the contact of relay 41. The release of relay 42 will close a path to light lamp 43 and operate relay 44 from battery on the break contact of relay 42 through lamp 43 to ground through the winding of relay 44. In operating, relay 44 will close a buzzer circuit to operate buzzer 45. Thus, the cord lamp associated with the plug which was pulled down will be lit, cut-off lamp 43 will be lit and cut-off alarm 45 will function. Relay 42 is made slow to release to prevent false operation of the alarm under ordinary disconnect conditions. The alarm will operate and stay operated until the cord has been restored to its proper place or other steps taken to release the relay 44.

If, however, a disconnect signal is received on either cord due to the operation of either relay 156 or relay 149, the locking up path for relay 40 will be opened and relay 40 will release and the circuit to the supervisor's cut-off alarm circuit will not be completed.

Another method of restoring the cut-off alarm circuit once it has been operated by the accidental removal of a cord is to place the cord into a special jack Fig. 13, which has ground on the tip, ring and sleeve of the jack. The ground on the sleeve and ring of this special jack will, when plugged into, operate the sleeve relays of the cord and also give the disconnect signal thus releasing the cut-off alarm relay 41 and restoring the normal condition of the circuit.

*Supervisor printer and peg count monitoring circuit*

In Fig. 4, there is shown a supervisor operator's printer set which is arranged to be connected to an operator's printer set by a key furnished at the supervisor's desk.

This circuit is located at a special desk and is for the purpose of monitoring on any desired operator's position at the switchboard by throwing a key associated with a particular position. An arrangement is also provided for checking the operator's peg count and for receiving and making calls through the switchboard over a line jack circuit similar to that shown in Fig. 1 below and to the right of line X—X.

Returning to the circuit connection under consideration, when the operator's printer set (Fig. 3) at the switchboard has answered the subscriber, it will be recalled, that negative battery 47 for the operator's printer set was obtained over the "Q" lead through the contacts of key 180 in Fig. 4. Assuming that the supervisor desires to monitor on the switchboard operator's printer, the supervisor will operate key 180 associated with the particular position upon which she wishes to monitor. This action will transfer the "Q" lead from negative battery 47 to the lower make contact of key 180, through the other keys associated with other positions, lower left break contact of key 48, then to upper right break contact of the same key, through one winding of relay 49, back over the upper left break contact of key 48, upper left make contact of key 180, upper right break contact of key 48, left make contact of key 48 to negative battery 50, operating relay 49 in the supervisor operator's printer circuit. It will be noted that the supervisor's set may only receive signals over this circuit since the sending contacts of the supervisor's printer are now short-circuited. This path is traced from the tip of jack 51 in the printer circuit, upper make contact of key 180, upper left break contact of key 48, to the tip of jack 52. The circuit for the supervisor's set is similar in construction to the circuit for the operator's printer set previously described. Relay 49 is normally held to its 5 contact by the biasing current through one of its windings. A closed circuit may be traced from battery on relay 49 through the break contacts of relay 54, sleeve of jack 51, sleeve of cord 55, printer magnet 53, sleeve of plug 56, to ground on sleeve of jack 52, thus normally holding the printer magnet 53 operated. The operation of relay 49, when connected into a circuit, operates relay 54 on a path traced from battery through make contact 4 of relay 49, winding of relay 54, sleeve of jack 51, sleeve of plug 55, winding of magnet 53 to ground on sleeve of jack 52 and plug 56. Relay 54 is designed as a slow release relay so that it will remain operated while relay 49 is following either the received or sent line signal impulses.

When the printer is not in use magnet 53 is held locked up, thus preventing a free whirling of the printer set. When the printer is in use and relay 54 is operated the printer magnet 53 is under control of relay 49. The motor for the printer will run continuously when the printer switch is on.

To provide means for checking the peg count, key 180 is so arranged that by one operation of the key all springs on the left and right side of the key as shown in the figure make contact. This will connect the peg count set of the supervisor in multiple with the peg count set of the operator. Each operator has an individual key 56 located at her position. Associated with key 56 are relays 57 and 58 and a register 59. At the supervisor's desk is a duplicate set of relays 61 and 62 and a register 63, also lamp 60. When the operator has received or answered a call, she presses key 56 which completes a circuit from ground on key 56, winding of relay 57, message register relay 58 to battery operating relays 57 and 58. Relay 57, in operating, places ground on its own winding to short-circuit itself. This ground also serves the additional purpose of insuring the operation of relay 58. The latter relay, in operating, actuates register 59 which contains a record of all calls. Relay 57, in short-circuiting itself, falls back and releases relay 58 and register 59. Relays 61 and 62 and register

63 function in the same manner since the ground from key 56 traces a path through the operated contacts of key 180 to operate relays 61 and 62. In addition, lamp 60 lights up on a circuit from ground on the contact of relay 61, when relay 61 operates. This lamp is a visible indication to the supervisor that the operator has pressed her peg count key. Registers 59 and 63 will operate and lamp 60 will light up simultaneously. It is to be understood, of course, that key 180 is located at the supervisor's desk and is individual to each operator's position at the switchboard.

The supervisor's desk is also provided with several trunk circuits for receiving calls and making outgoing calls over the switchboard in the same manner as an ordinary subscriber would do these things. Each trunk circuit has associated with it a three position key 48, an alternating current relay 64, a lamp 65 and connections T and R leading to a line jack circuit similar to the circuit shown in Fig. 1 below and to the right of line X—X.

When an incoming call is received over the T and R leads shown in Fig. 4, relay 64 will operate on a circuit traced from the ringing current at the sending end of the line over T of the line, through the secondary winding of A. C. relay 64, through the condenser to ground on the lower break contact of key 48. In operating, relay 64 will lock up over its primary winding and back contacts through key 48 to ground. From the other set of contacts of relay 64, lamp 65 will light and auxiliary signal relay 66 will operate to ground, in turn, operating bell 67 through key 68.

When key 48 associated with the indicated trunk is thrown to the right or print position, it will release relay 64 by removing the ground from its winding, which action extinguishes the lamp and releases the auxiliary signal bell. The printer of the supervisor's circuit will then be bridged across the tip lead T and ring lead R of the trunk line, on a path from R, left upper inner make contact of key 48, right upper break contact of key 48, tip of jack 51, tip of plug 55, sending contacts, tip of plug 56, tip of jack 52, winding of relay 49, right upper inner break contacts of key 48, left lower inner make contact of key 48 to tip lead T of the line. Communication between the supervisor and the calling party may now take place.

Key 48 is a special three-position key. If thrown to the right or hold position all contacts shown on the entire key will be actuated. Assuming that the supervisor wishes to hold the line over which a call has just come in while she desires to answer another trunk circuit, she will then throw key 48 to the hold position thus actuating all contacts, and disconnecting the supervisor's printer line relay from the trunk and replacing the printer set by resistance 69. This circuit is traced from lead R of the line, left inner upper make contact of key 48, right lower inner make contact of the same key, resistance 69, right lower outer make contact of key 48, left lower inner make contact of key 48 to tip lead T of the line. The supervisor is then free to receive calls or answer calls on another trunk.

When the supervisor restores key 48 to its normal position from either the print or hold position on the completion of a call the R side of the line is grounded on the left upper inner break contact which, in turn, causes the supervisory lamp in the incoming cord circuit to light and act as a disconnect signal to the calling operator. The tip lead T of the line is again connected through relay 64 and condenser to ground.

If it is desired to make an outgoing call, key 48 is operated to the left or print position in which case the printer line relay 49 is bridged across the tip lead T and ring lead R of the trunk, thereby operating the line jack lamp at the switchboard. This circuit through the key is the same as that traced hereinbefore when the supervisor operated key 48 to the print position in answer to an incoming call.

Service observing feature

In the drawings, Figs. 9, 10 and 11 show a complete service observing circuit for checking the service on subscriber's lines and trunk circuits. The circuits are connected to a special service observing position where a special type of cord circuit (Fig. 11) is located.

In practice, a line is connected from service observing jack 111 (Fig. 1) located on a test panel to a jack 70 of a link circuit (Fig. 9) located on the same test panel by means of patching cord 71 (Fig. 12). Patching cord 71 is an ordinary known type of three way connectining cord. The tip of the subscriber's loop (Fig. 1) is thereby connected over cord 71 through one winding of polarized relay 72 (Fig. 9) through the contacts of jack 73, back over the sleeves of jacks 70 and 111 to the line jack circuit. The ring of jack 111 is connected through patching cord 71, through the other winding of polarized relay 72 to positive 130 volt battery on the contacts of jack 73. The windings of relay 72 are wound differentially so as to oppose one another when they are both energized and thus prevent the relay from operating.

When a subscriber initiates a call, relay 72 will operate in series with relay 115 in the line jack circuit over the tip of the subscriber's loop, over a path described hereinbefore in connection with originating a subscriber's call. Relay 72 in operating will close a path to light lamp 74 located on the service observing board and to operate relay 81 in Fig. 10 from ground on the make contact of relay 72 to battery through lamp 74 and to battery over lead "a" through the winding of relay 81 (Fig. 10), operating relay 81. Relay 81, in operating, will open the path which normally holds sounder 82 operated and cause an audible click to be heard. Sounder 82 is normally operated on a circuit traced from battery through its winding, the contacts of relays 83, 81 and 84 in series, to ground on the relay contact of 84. Relays 84, 81 and 83 are each individual to a link circuit and there may be as many such relays as there are link circuits. Leads, a, a' and a", etc., connect each relay with an individual circuit.

It will be noted that the signal circuit of Fig. 10 is so arranged that leads a' and a" which connect with other link circuits may also actuate the same sounder if other calls are initiated simultaneously on other subscriber's lines connected to the link circuits associated with a' and a". For example, suppose another call causes the operation of relay 84 over lead a'. Then there will be operated relays 84 and 81, and a path will be completed at this time to operate sounder 82 from battery through the winding of sounder 82, break contact of relay 83, make contacts of relays 81 and 84 to ground. In this manner other calls will either operate or release sounder 82 and cause an audible click each time the sounder operates or releases.

The observer, upon noticing lighted lamp 74, will insert cord 75 which is associated with her receiving printer into jack 73 associated with the lighted lamp. The tip of the link circuit of Fig. 9 will thus be placed in series with one winding of polarized relay 76 and one winding of polarized relay 77 to complete a path back over the sleeve of plug 75 and the sleeves of jack 73 and 70. The contacts of jack 73 will be broken. At this time it should be noted that relays 76 and 72 are differential polar relays with a mechanical bias tending to keep their contacts non-operated. The windings of these relays are wound so that any current passing through one winding will create a flux which will oppose the flux caused by any current passing through the other winding. Current passing through the upper winding of relay 76 will tend to keep the relay non-operated while current flowing in the ring of the circuit through the lower winding of relay 76 will tend to operate relay 76. The reverse is true for relay 72. Current in the lower winding of relay 72 from the R of the loop will not operate relay 72 while current in the upper winding will operate 72.

With this fact in mind, it will be noted that relay 76 does not operate upon its insertion into jack 73 from current passing through its upper winding. When the operator at the switchboard answers the call the subscriber's loop will be closed through the subscriber's station in series with both windings of both relays 72 and 76, and the upper winding of relay 77. This path is traced from the tip of jack 111, patching cord 71, lower winding of relay 72, tip of jack 73, tip of cord 75, upper windings of relay 76 and 77, in series, sleeve of cord 75, sleeves of jacks 73 and 70 and 111 to winding of relay 115. The ring side of jack 111 will be connected through patching cord 71 to the upper winding of relay 72, ring of jack 73, ring of cord 75, lower winding of relay 76 to 130 volt positive battery. Relay 72 will therefore release since both of its opposing windings will be energized and lamp 74 thereby extinguished. Relay 76 will not operate at this time since the current in the ring side of the line is insufficient to overcome the opposing current in the tip side of the line which is aiding the mechanical bias of the relay. Relay 77 which has a small biasing current passing through its lower winding will operate at this time since the current flowing through its upper winding is sufficient to overcome this bias. The operation of polarized relay 77 will apply ground from its contact to the winding of relay 78 thus operating relay 78. Relay 78 is designed as a slow release relay so as not to break the connection with the receiving printer of the service observing operator while signals are being received. Relay 77 will follow the printer signals and in this manner the observer may be able to receive the signals on the line under observation.

When the subscriber disconnects, ground is placed on the ring of the subscriber's loop and the tip circuit of the loop is opened. This will cause relay 76 to function and light lamp 80 from ground on the upper contact of relay 76 to battery through the lamp. Relay 72 will not operate since the current through the ring winding of relay 72 will tend to aid its mechanical bias and keep it non-operated. The observer, upon noting lighted lamp 80, will remove her cord 75 and the circuit will return to normal. Relay 78 will release and apply ground from its normal break contact to hold the magnet in the service observer's receiving circuit operated.

Associated with each toll line circuit is an observer's jack 161 (Fig. 5) which functions in a similar manner to that described for the line jack circuit except for the fact that the ring of the circuit is opened until relay 177 in the toll circuit operates. The operation of relay 177 applies ground to operate relay 76 and light lamp 80 in the observer's cord circuit.

Subscriber's line extension circuit

Subscribers' loop circuits extend from the station to the central office and are ordinarily designed not to exceed a certain value of resistance. This value of resistance is determined by the design of the relays at the subscribers' printer station and at the central office which function properly with a pre-determined minimum energizing current.

The line extension circuit now to be described in detail provides a means of extending the length of a subscriber's line beyond the length of one loop having a maximum resistance value for satisfactory relay operation without the use of a toll line. This is effected by utilizing a repeater point at which two loops of a certain maximum resistance may be connected together in tandem. At the repeater point, a single line repeater of the type disclosed in U. S. Patent 1,479,430 to J. M. Fell, January 1, 1924, supra, may be used in connection with the relay equipment shown in Fig. 6.

Referring to Fig. 6, the tip of the loop from the subscriber's station is shown normally connected to battery at the repeater by tracing a circuit from T of the loop through the upper break contacts of relays 201 and 202 to battery 203 while the ring of the loop from the subscriber's station passes through the secondary winding of relay 204, lower inner break contact of relay 201, upper break contact of relay 206 to ground.

When the subscriber initiates a call the tip and ring of the loop at the subscriber's station is closed through the subscriber's printer. This action will operate relay 204 over the paths previously traced for the tip and ring on a circuit from battery 203 to ground on the contact of relay 206. The operation of relay 204, in turn, will operate relay 207 from ground on the upper make contact of relay 204, through the upper break contact of relay 208, contact and winding of relay 207 to battery. Relay 207, in operating, will lock up over its upper make contact and apply ground from the same contact through the lower break contacts of relay 206 to battery through the winding of relay 201, thus operating relay 201. Relay 201, in operating, closes the tip of the subscriber's loop from its upper outer make contact through to the primary winding of relay 204 through one side of the single line repeater 200 to negative battery, while it connects the ring side of the line from the subscriber through its lower inner make contact to positive battery. Relay 201 also connects the tip of the line from the switchboard through its upper inner make contact through the single line repeater, through its lower inner make contact to the ring of the line to the switchboard, thus closing the circuit to the central office and lighting the calling lamp thereat.

Relay 204 is designed as a differentially wound relay with its two windings opposing one another. Therefore, the circuit over the tip side of the line from the subscriber's station through the primary winding of relay 204 releases relay 204 since current is now flowing through both of its windings. The release of relay 204 closes a circuit from ground on its upper break contact through the lower make contact of relay 207 through the secondary winding of relay 208 to battery, operating relay 208 which locks up through its secondary and lower make contact to ground on the upper make contact of relay 207. The circuit is now ready for communication between the subscriber's station and the central office.

When a disconnect is sent by the subscriber the station apparatus is restored to normal, i. e. the tip of the line is opened and the ring of the line is grounded. This action opens the circuit through the primary or tip winding of relay 204 and keeps the secondary or ring winding of relay 204 energized, thus causing the operation of relay 204. Relay 204, in operating, closes a path to operate relay 209 from ground on the upper make contact of relay 204, upper make contact and winding of relay 208, winding of relay 209 to battery. Relay 209, in operating, places a ground from its make contact to the other side of the winding of relay 207 thus short-circuiting relay 207 and causing it to release. The release of relay 207 causes the release of relay 201 by removing ground from the upper make contacts of relay 207. At this time relay 208 does not release when relay 207 falls back because the primary winding of relay 208 is kept energized through the winding of relay 209. Relay 201, in releasing, transfers the tip of the subscriber's loop from the repeater circuit to battery 203 through the contacts of relays 201 and 202. The ring of the subscriber's loop is restored to ground by the release of relay 201 through the contacts of relays 201 and 206. The tip of the line from the switchboard is restored to the winding of relay 202 while the ring of the line from the switchboard is restored to the winding of polar relay 210. The restoration of ground to the ring of the subscriber's line by the return to normal of the subscriber's station apparatus and the release of relay 201 de-energizes the secondary winding of relay 204 and causes it to release. This action removes ground from the primary winding of relay 208 and the winding of relay 209 causing both of these relays to release. The circuit is therefore again normal.

When an incoming call is received from the central office, alternating ringing current is applied to the tip of the line from the switchboard. Relay 202 which is an A. C. relay will operate on a path from the tip of the switchboard, upper inner break contact of relay 201, winding of relay 202, through a condenser to ground. The operation of relay 202 will transfer the tip of the line going to the subscriber from battery on its upper break contact to 20 volt ringing current source 211. This operation of relay 202 will occur on each application of ringing current to the tip of the line from the switchboard, and battery 203 will be restored to the tip of the subscriber's loop when ringing is withdrawn by the release of relay 202. A response by the subscriber will actuate the same relays hereinbefore mentioned when the subscriber initiated a call.

If the subscriber does not answer the ringing current applied to his station equipment and it is desired to send a message to that station on an unattended basis, the subscriber's set may be started by the operator at the switchboard by her depressing the unattended station key. This action reverses the polarity of battery applied to the ring from the switchboard and operates polar relay 210. The operation of relay 210 will in turn operate relay 206 from ground on the make contact of relay 210 to battery through the winding of relay 206. The operation of relay 206 will remove ground from the ring of the loop to the subscriber's set and apply reversed polarity (negative) to the ring of the subscriber's set. This occurs by the transfer of the upper outer armature of relay 206 from the outer break contact to the outer make contact having negative 130 volt battery.

The application of negative battery to the ring of the subscriber's loop through the secondary winding of relay 204 to ground at the station will operate relay 204. The operation of relay 204, in turn, will complete a path to lock up relay 206 on a circuit traced from ground on the make contact of relay 204, break contact of relay 208, upper inner make contact and winding of relay 206 to battery. Relay 206 is designed as a slow release relay so that, upon its operation, it will remain operated for a short interval of time and insure its locking up when relay 204 operates. Slow release relay 206 remains operated a sufficient time, after its locking up path is opened by the release of relay 204, to insure that relay 201 becomes operated. Relay 207 will also operate from the same ground on the make contact of relay 204. The reversed battery sent over the ring of the line to the subscriber will operate polarized relay 110 at the station to start the subscriber's set. When the tip and ring of the subscriber's loop are closed through the station apparatus, relay 204 will release since negative battery on the ring of the line from relay 206 through the secondary winding of relay 204 will meet negative battery on the tip of the line from battery 203. In releasing, relay 204 will close a path to operate relay 208 on a path from ground on the break contact of relay 204, make contact of relay 207 to battery through the winding of relay 208. Relay 208, in operating, will operate relay 201. Relay 206 will now release. Note that slow release relay 206 remains operated after its locking up path was opened by the release of relay 204 until after relay 201 operated. Relay 201 will operate through the lower make contacts of relays 206 and 208 to ground. Relay 206, upon releasing, will close a path to keep relay 201 locked from ground on the break contact of relay 204, lower make contact of relay 207, lower inner make contact of relay 208, lower break contact of relay 206 to battery through the winding of relay 201. The circuit is now ready for communication between the subscriber's station and the central office. The disconnect will take place in the manner previously described.

*Subscriber's line toll extension circuit*

The purpose of this circuit is to establish a connection from a central office to a subscriber's station located at a great distance from the office by utilizing a toll line.

Referring to the drawing of Fig. 7, 7—a illustrates that part of the circuit which is located nearest the subscriber's station between the subscriber's loop and the long line telegraph circuit. 7—b shows that part of the circuit which is located nearest the switchboard between the central office line and the long line telegraph channel. Circuits 7—a and 7—b are shown connected to a telegraph channel through terminal repeater stations TR'' and TR'''. 7—b includes a single line repeater station 220. It is to be understood, of course, that the single line repeater station is located at a great distance from 7—a. In practice, several repeater stations will be located between 7—a and 7—b with terminal repeaters nearest the two circuits and telegraph channels connecting the various repeater stations. In this manner, a subscriber located hundreds of miles from a switchboard may be connected to the central exchange system. The single line repeater and the terminal repeaters may be of a known type such as is disclosed in U. S. Patent No. 1,752,436 to F. S. Kinkead dated April 1, 1930, supra.

Under normal conditions, when the circuit is not in use, negative battery is connected to the tip side of the subscriber's line through the back contacts of relays 212 and 213. The ring side of the subscriber's line is grounded through the secondary winding of relay 214, the lower outer break contact of relay 212 and the upper make contact of operated relay 215 to ground. Relays 215 and 216 are normally held operated from negative battery in the repeater 220 over AT lead, winding of relay 216, upper inner break contact of relay 212, one winding of relay 215, lower inner break contact of relay 212, upper break contact of relay 217, to the positive side AR of the repeater 220. The operation of relay 216 operates slow release relay 231 from ground on the lower make contact of relay 216.

The tip side of the line connected to the switchboard is connected through the upper break contact of relay 218, winding of relay 219, through the condenser to ground. The ring side of the line to the switchboard is connected to ground through the lower break contact of relay 218 and lower winding of polarized relay 221. The BT lead of the single line repeater 220 is normally connected to negative 130 v. battery through the upper inner break contact of relay 218 and break contact of relay 219. The BR lead of the repeater is connected to positive 130 v. battery through the winding of relay 222, lower inner break contact of relay 218, upper winding of relay 223, contact of polarized relay 221 to positive 130 v. battery thus operating relays 222 and 223. The operation of relay 222 operates slow release relay 232 from ground on the make contact of relay 222.

A subscriber initiates a call by pressing the start key at the subscriber's station which connects the tip and ring of the subscriber's loop through the printer circuit. This will cause relay 214 to operate on the circuit traced above from negative battery over the tip, back over the loop, through the lower winding of relay 214 to ground on relay 215. In operating (relay 214 will operate relay 224 on a circuit from ground on the make contact of relay 214, winding of relay 224 to battery on the upper break contact of relay 230. Relay 224 will lock up on ground over its upper contact and will operate relay 212 from ground on the upper make contact of relay 224, through the lower make contact of relay 215, winding of relay 212, upper winding of relay 215 to battery on the break contact of relay 230. Relay 224, inoperating, will also operate relay 217 on a path traced from the ground on the upper make contact of relay 224, lower make contact of relay 215, break contact of relay 225, winding of relay 217 to battery. Relay 212, in operating, closes through the tip of the subscriber's line to the repeater 220 from T of the line, upper winding of relay 214, upper make contact of relay 212, winding of relay 216 to AT of the repeater 220. Relay 217, in operating, will operate relay 225 from ground on the lower make contact of relay 217 to battery through the winding of relay 225. Relay 225, in operating, will lock up on the ground which operated relay 217 originally and will open the operating path for relay 217 which will fall back. The ring side of the subscriber's line is now closed through from R of the line, lower winding of relay 214, lower inner make contact of relay 212, upper break contact of relay 217 to AR of the repeater 220. Relay 214, which is a differentially wound relay, will release, since both of its windings are now energized. As mentioned above, under normal conditions, the AT and AR leads of the repeater were connected through the windings of relays 216 and 215. The operation of relay 212 and the operation and release of relay 217 opened, for an instant, the closed circuit path for the AT and AR leads of the repeater 220 through the apparatus at 7a before the path was again closed through the T and R leads of the subscriber's loop.

The open pulse generated by this action will cause a relay in repeater 220 to function which will apply ground to the AH lead of the repeater thus causing relay 226 to operate. This ground is supplied in the repeater 220 during a break condition coming from the subscriber by any contact grounded in the repeater during such a break condition; such ground may be readily supplied in any one of several manners by one skilled in the art. Relay 226, in operating, will lock up from ground over its upper make contact and the break contact of relay 227. In operating, relay 226 will close a path to operate relay 218 from battery through the winding of relay 218, lower make contact of relay 226 to ground. Relay 218, in operating, will connect the BT side of the repeater 220 through the upper inner make contact to T of the switchboard. BR of the repeater will be connected to R of the switchboard through the winding of relay 222 and lower inner make contact of relay 218. The path through relay 223 will be opened and this relay will release. The loop circuit thus formed will be isolated from ground and the call of the subscriber may now be completed through the switchboard. During communication relays 216 and 222 will follow the printer signals.

Returning now to the normal condition of the circuit and assuming that a connection is to be completed to a long line subscriber, positive battery is applied to the switchboard end of the ring side of the line and ringing voltage is applied to the tip side. Relay 219 will operate from the ringing current and will, in turn, apply ringing voltage to the BT lead of the single line repeater from its make contact. As the BR lead of the repeater is normally connected to negative battery whose voltage is approximately equal to the peak voltage of the ringing supply, dots at the ringing frequency will be transmitted over the long lines circuit. The ringing frequency dots transmitted over the long lines circuit will cause relay 216 to pulsate. Relay 215, however, which is a slow release relay will remain operated. The vibrations of relay 216 will alternately charge and discharge condenser 228 on a path from ground on the inner make contact of relay 216, to condenser 228, winding of relay 213 to ground. Condenser 228 will therefore charge and discharge through the winding of relay 213, thus operating relay 213 which, in turn, will apply ringing voltage to the tip side of the subscriber's line from generator 229 on its make contact, upper outer break contact of relay 212 to the tip of the subscriber's line.

The called subscriber will answer the ringing bell at his station by operating the starting switch at his station. A starting pulse will then be transmitted over the long line by the action of relays 212, 217 and 225, as previously described in connection with starting a call. The starting pulse will be received by the repeater 220 in the same manner as heretofore described and relay 218 will operate. This will cause the ringing current supplied at the switchboard to stop.

If the calling subscriber associated with the switchboard wishes to transmit to the called subscriber on an unattended basis, in case the called subscriber (over the long line circuit) does not answer within a reasonable time, the inward switchboard operator, operates and holds a key which will cause negative polarity to replace the positive battery applied to the ring side of the line. The reversed current will operate polarized relay 221 over a circuit from R of the switchboard line, through the lower outer break contact of relay 218 to ground through the winding of polarized relay 221. In operating, relay 221 will open the BR path through its contact. This opening, caused by the operation of the relay 221, will cause the repeater 220 to send an open signal over the long line circuit. Slow release relay 223 will release since its operating path through the contacts of relay 221 will be opened. Upon releasing, relay 223 will reclose the line through the break contact of relay 223 and the secondary winding of relay 221. The re-established line current is so directed through the secondary winding of relay 221 as to hold relay 221 operated.

During the time slow release relay 223 is releasing, the open pulse transmitted causes relay 215 to release, which in turn, applies negative 130 v. battery from its upper break contact to the ring side of the subscriber's line instead of ground. Relay 214 will now operate over its secondary winding upon the application of the 130 v. negative battery through its secondary winding to ground at the subscriber's station. Relay 214, in operating, will cause relay 224 to operate and lock up. The current in the ring side of the line will be in the proper direction to close the printer control circuit at the subscriber's station. When the tip and ring side of the line through the subscriber's printer is closed through, relay 214 will release because the same negative polarity will then be applied to both ends of the loop. The release of relay 214 applies ground from its break contact through the lower make contact of relay 224, lower break contact of relay 215 to operate relay 217 over a battery circuit traced through the break contact of relay 225. The release of relay 214 also causes the operation of relays 212 and 215 in series over a circuit traced from battery on the break contact of relay 230 to the same ground on the break contact of relay 214. Relay 215, in operating, establishes a holding path over its lower make contacts and the make contact of relay 224. It will be noted that the lower winding of relay 215 is short-circuited by the operation of relay 224. This is to insure that relay 215 does not operate until relay 214 releases, which will occur when the station is ready to receive signals. The operation of relay 212 will extend the T and R of the subscriber's loop to the repeater circuit 220 as previously described. Relays 217 and 225 will transmit the open pulse which will cause the operation of relays 226 and 218. The closing through of the T and R of the switchboard line will be an indication to the operator that the station is ready to receive signals.

When the circuit is in the printer signaling condition, the subscriber's line and the switchboard line are connected directly to the repeater. Relays 216 and 222 will follow all signals. Relays 231 and 232 are designed as slow release relays and will remain operated on all signals except the disconnect and the break signal.

When a subscriber disconnects the T and R loop circuit will be opened. Ground will be applied to the ring side of the subscriber's line and the tip side of the line will be connected through a ringer and condenser at the subscriber's station to ground. Relays 216 and 222 will release, in turn, releasing relays 231 and 232 respectively. A circuit will be closed from battery on the break contact of relay 231 to interrupted ground 237 through rotary magnet 234, thus operating rotary magnet 234. Similarly, a circuit will be closed from battery on the upper break contact of relay 232 to interrupted ground 238 through rotary magnet 235, thus operating rotary magnet 235. The wipers of selectors E, F and G will be advanced at the rate of one contact per second which is the rate of interruption for periodic ground interrupters 237 and 238. When the wiper of E selector makes contact with the tenth contact, ground will be applied from the wiper to operate relay 230 which will operate and lock up on ground on the off-normal contact 239. Relay 230, in operating, will remove battery from the holding circuits of relays 215, 224 and 212 and these relays will release. Relay 224, in releasing, will cause the release of relay 225. As relay 215 is a slow release relay it will remain operated until after relay 212 releases, at which time, the loop circuit of the repeater will be completed through the primary winding of relay 215. Relay 216 will now operate and relay 215 will also be operated. In operating, relay 216 will operate relay 231 which will transfer battery from the rotary magnet 234 to the release magnet 233. Release magnet 233 will remain operated from ground on the off-normal contacts until contacts 239 are opened. When the selector returns to normal contact 239 will open, relay 230 will release and the circuit of 7—a will return to its original condition.

Approximately eight seconds after the subscriber's loop was opened, wiper F in circuit 7—b will have reached the eighth contact. When this occurs relay 227 will operate from battery through its winding through wiper F to ground on the break contact of relay 232. Relay 227 will lock up through its lower make contacts to ground on the off-normal contact 240.

Ground will be transferred from the upper break contact of relay 227, which is the locking contact of relay 226, to the upper make contact of relay 227. A circuit will therefore be completed to operate relay 223 through its secondary winding from ground on the upper make contact of relay 227 to battery through the winding of relay 223. Relay 226 will not release at this time, however, because ground is applied to its winding from the AH lead of the repeater until the long line circuit is again closed through at the contacts of relay 212 upon the release of relay 212. Relay 223 will remain operated preparatory to the re-establishment of the circuit through its primary winding which will occur at the end of 10 seconds when the long line circuit closes due to the release of relay 212, as previously described. Ground will be removed from the AH lead of the single line repeater thus releasing relay 226. At this time, the equipment in the repeater on the side toward the switchboard will close. The release of relay 226 will open the operating path of relay 218 which will also release. In releasing, relay 218 will close through the local holding circuit for the side of the repeater nearest the switchboard and the BT lead will again have its circuit re-established through the contacts of relays 218 and 219 to negative battery. The BR lead will also have its circuit closed through the windings of relays 222 and 223 to positive battery over the contact of relay 221. The tip side of the switchboard line will again be closed through the winding of relay 219 to the condenser to ground. The ring side of the switchboard line will also be connected to ground through the primary winding of relay 221. This action will cause a disconnect signal to be sent to the switchboard operator. The re-operation of relay 222 will close through the circuit to re-operate relay 232. In operating, relay 232 will apply battery from its upper make contact to "release magnet" 236 for restoring selectors G and F to normal. The operation of relay 232 also opens the circuit through rotary magnet 235. The circuit through the release magnet will step the selectors G and F back to normal and open the off-normal contact 240. The locking circuit for relay 227 will, therefore, be opened and relay 227 will release and open the operating circuit through the secondary winding of relay 223. Circuit 7—b has now been returned to its original normal condition.

*Test key for subscriber's printer set*

Key 105 at the subscriber's station is provided for testing the printer's set locally while the loop is arranged so that the operator can ring. When the subscriber operates key 105, the subscriber's T and R loop is disconnected from the subscriber's set, the tip T is connected through the ringer circuit to ground, and the ring R is connected directly to ground through the contacts of key 105. Battery is thereby connected through the lower make contact of key 105 to operate relay 107 on a circuit from ground through the upper make contact of the key, printer contact 101, winding of relay 107 to battery on the lower contact of key 105, thereby operating relay 107. Relay 107, in turn, actuates the printer magnet 100 from ground on its make contact. The motor may now be started and the printer tested locally while the loop is arranged so that the operator can ring.

What is claimed is:

1. A telegraph exchange system comprising a plurality of central offices, loop circuits, each terminating in at least one jack, extending from each central office to a plurality of subscribers' telegraph stations individual to each office, telegraph trunk circuits interconnecting said offices, cord circuits at each office for interconnecting the loop circuits terminated thereat or for connecting a loop circuit to a trunk circuit for communication purposes, and operators' telegraph printer sets at the central office with means comprising part of said cord circuits for operatively associating said printer sets with a loop circuit, each operator's telegraph printer set being provided with connecting devices adapted to associate it with any of a plurality of cord circuits.

2. A telegraph switching system comprising a central office, a subscriber's station including telegraphic sending and receiving equipment, a switching operator's position at said central office, another operator's position including telegraphic sending and receiving equipment also at said central office, means including cord circuit and jack equipment whereby said switching operator may extend said subscriber's line to said other operator for intercommunication between said subscriber and said other operator, a signal for indicating to said switching operator and controllable over said subscriber's line for informing said operator that the subscriber is calling, a signal for indicating to said other operator (65) and controllable by said switching operator upon extending said subscriber's line to said other operator for communication, and signals for indicating to said switching operator controllable by said other operator or said subscriber respectively, to notify said switching operator that the communication is ended and said extended line is ready for disconnection.

3. In a telegraph system, a subscriber's telegraph apparatus, a line extending therefrom to the central office and terminating in line equipment, central office equipment common to a plurality of lines, a circuit closing device at the subscriber's telegraph apparatus, said device upon being operated causing said subscriber's line to be closed to a point of given potential in said subscriber's line equipment, a jack included in said subscriber's line, a plug in said central office equipment, relay means included in a circuit controlled by the insertion of said plug in said jack to transfer said line from said point of given potential in said subscriber's line equipment to a point of similar potential in said central office equipment.

4. A system in accordance with claim 3, in which said relay means includes at least one relay in said subscriber's line equipment.

5. A system in accordance with claim 3, in which said relay means includes at least one relay in said central office equipment common to a plurality of lines.

6. A system in accordance with claim 3, in which the line extension to said point of given potential in said central office equipment extends through a telegraphic repeater.

7. A telegraph exchange system provided with a junction or link circuit containing a telegraph impulse repeater for connecting together for telegraph communication lines terminating at said office, said lines including local lines to subscribers' instruments and trunk lines to other central offices, said trunk lines each having at least one telegraph impulse repeater included therein, and devices in said junction or link circuits whereby they function to operatively and interchangeably connect for telegraphic communication any of said lines terminating at said central office.

8. A signal arrangement for a telegraph switchboard system in which a plurality of line circuits terminate at a central office, comprising a signal lamp in the central office for giving indication of an existing condition of a line circuit, in which means in said line circuit control means in said central office for causing said lamp to glow to give one indication, and means in said line circuit control means in said central office for causing said lamp to glow in a different manner to indicate a different condition in said line circuit.

9. A signal arrangement for a telegraph switching system, in which a plurality of line circuits terminate at a switchboard, there being two types of said line circuits, a signal lamp at said switchboard designed to call the operator's attention to a particular line circuit, and means whereby said lamp is caused to glow in one manner as a result of its association with one type of line circuit to call attention thereto, and means whereby said lamp is caused to glow in another manner as a result of its association with another type of line circuit to call attention thereto.

10. A telegraph exchange system comprising a central office, a plurality of subscribers' telegraph printer stations individual to such office, a line circuit extending from each subscriber's station to said central office, operators' telegraph printer sets at said office, cord circuits at each position for interconnecting the line circuits terminating at the central office, switching devices at a position for connecting an operator's set associated with said position with any cord circuit in said position, and looping arrangements on said switching devices whereby a printer set located in an adjacent position may be connected to a cord circuit in said first position by operating a switching device of said first position associated with said cord circuit.

11. In a telegraph exchange system, an operator's telegraph printer set located at a position, a group of keys, circuit means for connecting said set to said group of keys located at said operator's position, cord circuits at the position, each key of said group being individually associated with a cord circuit on said position, a second group of keys located on an adjacent position and associated with a second group of cord circuits on said adjacent position, additional circuit means connecting both groups of keys, said additional circuit means serially connecting said first circuit means to said operator's printer set, said printer set responsive to the operation of a key in either group for connecting said set to the cord circuit associated with said operated key.

12. In a telegraph exchange system, an operator's printer set, a cord circuit associated with said set, a second operator's printer set, a second cord circuit associated with said second printer set, and circuit opening and closing devices for operatively associating said first printer set with either one of said two cord circuits.

13. In a telegraph exchange system, an operator's printer set, a cord circuit associated with said set, a second operator's printer set, a second cord circuit associated with said second printer set, and circuit opening and closing devices for operatively associating either one of said two printer sets with either one of said two cord circuits.

14. In a telegraph exchange system, an operator's printer set, a cord circuit, a circuit opening and closing device for operatively associating said cord circuit with said set, a second operator's printer set, and a second cord circuit, a second opening and closing device for operatively associating said second cord circuit with said second printer set, each of said two printer sets being serially connected to said devices, and each of said devices being adapted to associate one of said two cord circuits with either one of said two printer sets and to simultaneously disassociate said same cord circuit from the other one of said printer sets.

15. A system as defined by claim 12, characterized in this, that said devices for operatively associating said first printer set with either one of said two cord circuits comprising key switching apparatus.

16. A telegraph exchange system comprising a central office, a plurality of subscribers telegraph stations individual to such office, a line circuit extending from each station to said central office, cord circuits at the central office for interconnecting the line circuits terminating thereat, operator's telegraph printer sets associated with the cord circuits, lamp indicators individual to each cord circuit, periodically interrupted current means in said cord circuits, circuit means in each of said cord circuits responsive to a signal from a subscriber connected through one of said cord circuits for associating said periodic current means with one of said lamp indicators in said cord circuit, and manually operable means for thereafter disassociating said lamp indicators from said periodic current means.

17. A telegraph subscriber's printer station, a second telegraph subscriber's printer station in communication with said first station, a line circuit individual to each station and connecting each station to a central office, a cord circuit at said central office operatively associated with said line circuits, said cord circuit comprising a repeater connected between an answering plug and a calling plug, the answering plug being operatively associated with the first telegraph subscriber's station, the calling plug operatively associated with the second telegraph subscriber's station, a signalling device at said first station, a second signaling device at said second station, relay and circuit means in said cord circuit responsive to single operation of said first signaling device at the first telegraph subscriber's station for causing an intermittent flashing lamp indication, and additional relay and circuit means in said cord circuit responsive to the operations of said second signaling device at the second telegraph subscriber's station for causing an interrupted lamp indication only in accordance with the interruptions of said second switching device.

18. In a telegraph system, a printer station, a switchboard, a line extending from said station to said switchboard, a link circuit at said switchboard operatively associable with said line, an indicator at said switchboard, and electrically controlled instrumentalities at the switchboard associated with said link circuit responsive to a manual operation at said station for causing said indicator to operate intermittently when the link circuit is operatively associated with the line.

19. In a telegraph system, a printer station, a switchboard, a line extending from said station to said switchboard, a cord circuit at said switchboard operatively associated with said line, a lamp, circuit means and current means associated with said cord circuit for energizing said lamp intermittently, said circuit and current means being responsive to a signal over said line for causing said lamp to light up intermittently.

20. In a telegraph system, a subscriber's printer station, a central office, a two-wire line connecting said station with said office, a cord circuit associated with said two-wire line, a lamp, a source of current supply for energizing said lamp intermittently, and circuit means for associating said source of current supply with said lamp, a flash key at said subscriber's station, said circuit means being responsive to a single operation of said key for associating said source of current supply with said lamp for intermittently energizing said lamp.

21. In a telegraph system, a subscriber's printer station, a central office, a two-wire line connecting said station with said office, a cord circuit associated with said two-wire line, a lamp, a source of current supply for energizing said lamp intermittently, and circuit means for associating said source of current supply with said lamp, said circuit means being responsive to a momentary change of condition of said line whereby ground is placed on one wire of said line and the other wire of said line is opened, for associating said source of current supply with said lamp for intermittently energizing the lamp.

22. In combination in a normally closed telegraph circuit a relay magnet responsive only to a strong current, an armature therefor, and a local circuit connected to said armature to be closed and opened thereby, said local circuit being connected to control said relay magnet and to prevent the response of any other strong current responsive relay magnet thereafter connected in a similar manner to the same telegraph circuit.

23. A cord circuit for a telegraph exchange system for connecting subscriber's telegraph sets for communication purposes comprising relay means connected between two plugs, each plug having a tip, ring and sleeve circuit, circuit means connected in the sleeves of said plugs, a potentiometer arrangement in the sleeve circuit of one of said plugs and associated with said circuit means, said circuit means being responsive to the association of said one plug with an idle line for properly connecting said cord circuit for communication with said idle line, and said circuit means being responsive to the association of said one plug with a busy line for preventing the operative association of said cord circuit with said busy line.

24. In a telegraph exchange system, a plurality of subscriber's stations, loop circuits individually connecting said stations to a central office with each loop circuit terminating in a plurality of jacks, cord circuits at the central office for interconnecting said loops, each cord circuit comprising a repeater with suitable relay mechanism connected between plugs, an operator's telegraph printer set at said office, manually operable means individual to each of said cord circuits, circuit means responsive to the operation of one of said manually operable means for associating said operator's set to the cord circuit associated with said one means, and relay means in said cord circuit responsive to the association of said cord circuit with a loop circuit for preventing the operative connection of said loop circuit with any other cord circuit thereafter associated with said loop circuit through another jack while said first cord circuit is still associated with said loop circuit.

25. In a printing telegraph switching system having a circuit for connecting lines for impulse telegraphy communication, means for preventing the simultaneous connection of more than one cord circuit with the same line circuit, comprising a potentiometer arrangement in each cord circuit including circuit controlling devices for connecting the communication path in said cord circuit to a line circuit, said circuit controlling devices being responsive only to the operative association of said cord circuit with an idle line, said circuit controlling devices not being responsive to the operative association of said cord circuit with a line already closed for communication between printer sets.

26. In a telegraph system, line circuits, cord circuits containing telegraphic repeaters adapted to interconnect two of said line circuits, means for preventing the simultaneous connection of more than one cord circuit with the same line circuit, comprising a potentiometer arrangement connected in the sleeve of the cord circuit including circuit controlling devices adapted to connect the communication path in a cord circuit to a line circuit, said circuit controlling devices being responsive to the operative association of a cord circuit with an idle line circuit to alter the potential distribution of said potentiometer.

27. In combination, a normally closed telegraph cord circuit for communication between subscribers, visible and audible signal indicators, relay and current supply means for operating said indicators, means for associating said indicators with said normally closed circuit whereby said indicators are disconnected from said relay and current supply means, said last means being responsive to an abnormal opening of said closed telegraph circuit for connecting said relay and current supply means to said indicators for operating the same.

28. A subscriber's telegraph station, a second subscriber's telegraph station in communication with said first station, loop circuits connecting said stations to a central office, a cord circuit at said central office associated with said loop circuits, said cord circuit comprising relay means connected between two plugs, visible and audible signal means associated with said relay means, current means for operating said signal means, said relay means being responsive to the disassociation of either of said two plugs from said loop circuits before communication between subscribers ceases to associate said current means with said visible and audible signal means.

29. In combination, a telegraph circuit closed for communication between subscribers, a circuit including a visible indicator, electrically controlled devices normally disassociated from said indicator for operating said indicator, said devices being responsive only to an abnormal opening of said closed telegraph circuit for operating said indicator.

30. In combination, a cord circuit having two ends for association with a telegraph line, a lamp indicator, relay and current means for energizing said lamp indicator, said means being external of said cord circuit and associated therewith, said relay and current means being responsive to the operative association of either of said ends said cord circuit with a normally closed telegraph communication circuit for lighting said lamp indicator.

31. In a telegraph exchange system, two subscribers' stations equipped with telegraph sending and receiving means, loop circuits individually connecting said stations to a central office with each loop circuit terminating in a plurality of jacks thereat, a cord circuit at the central office and interconnecting said loop circuits, said cord circuit comprising a telegraph repeater with suitable relay means connected between plugs, an operator's printer circuit associated with said cord circuit, a second cord circuit, a visible signal indicator associated with said second cord circuit, current means for operating said indicator, and circuit means responsive to the subsequent association of said second cord circuit with either of said loop circuits while said first cord circuit is still associated with said loop circuits for operatively associating said current means with said visible signal indicator.

32. In combination, a cord circuit comprising a repeater connected between two plugs, each plug having a tip, ring and sleeve connection, means connecting the tip of each plug to the repeater and to each other, a lamp indicator external of said cord circuit, relay means associated with said lamp indicator for energizing said lamp indicator, and circuit means responsive to the association of a tip of one of said plugs with the sleeve of a busy line jack circuit for associating said relay means with said lamp indicator.

33. A transmission circuit comprising a repeater connected between two plugs, each plug having a tip, ring and sleeve connection, a line circuit, visible and audible indicators, current means for energizing said indicators, and circuit means responsive to the operative association of the tip of one of said plugs with said line for associating said current means with said audible and visible indicators, additional circuit means in the sleeves of said plugs responsive to the association of said transmission circuit with an idle line circuit for disassociating said current means from said indicators.

34. In combination, a link circuit, an indicator circuit including an indicator, relay mechanism, a switching device for associating said relay mechanism with said indicator, said mechanism being responsive to the operative association of said link circuit with an open subscriber's loop circuit and the actuation of said switching device for energizing said indicator.

35. In combination, a link circuit, an indicator circuit including an indicator, a relay associated with said link circuit and under control of a second relay, said first relay being responsive to the operative association of said link circuit with an open subscriber's loop circuit or with a loop circuit already closed for communication with another link circuit for energizing said indicator, said second relay functioning to prevent the operation of said first relay when said link circuit is connected for communication with a subscriber's loop.

36. In a telegraph switching system, a subscriber's line terminating in a multiple jack at a central office, a starting instrumentality (key 102) at the subscriber's end of said line, relay devices at the central office end of said line controlled by said starting instrumentality for placing a potential upon an element of said jack to indicate a busy condition.

37. In a telegraph switching system, a subscriber's line terminating in a multiple jack at a central office, a starting instrumentality at the subscriber's end of said line, relay devices at the central office end of said line controlled by said starting instrumentality for placing a potential upon an element of said jack to indicate a busy condition plus a call signal also energized by said relay devices, devices in a cord circuit which terminates in a plug operable upon plugging said plug of said cord circuit into a jack of said multiple to restore said call signal to the non-energized condition and to transfer the source of said potential indicating a busy condition from the control of said relay devices to a relay in said cord circuit.

38. In a telegraph switching system, a subscriber's line terminating at a multiple jack, an instrumentality at the subscriber's end of said line, relay devices at the central office end of said line controlled by said instrumentality for placing a potential upon an element of said jack to indicate a busy condition, a plug for insertion in said jack, and devices whereby said plug upon receiving the potential causes the operation of a cord circuit sleeve relay connected to the sleeve of said plug, a locking circuit for locking said sleeve relay up, and means whereby said relay upon operating closes a path from said subscriber's line to an operator's printer set.

39. In combination in a normally closed telegraph circuit, a telegraph wire channel, at least one repeater circuit in said telegraph channel, a device for transmitting a disconnect signal thereover in response to a break signal of predetermined time interval, said device comprising a selector switch, periodically interrupted circuit means for operating the same, relay means associated with said selector and responsive to an open signal in said telegraph circuit for associating said selector with said interrupted current means whereby the brush arms thereof are advanced in accordance with said periodic current interruptions, means responsive to the advance of said brush arms to a predetermined position for opening the telegraph circuit, additional means responsive to the advance of said brush arms to a predetermined position for disconnecting said interrupted current from said selector and for restoring the brush arms to normal.

40. A subscriber's telegraph printer set, a printing telegraph switchboard, a subscriber's line extension circuit comprising two separate circuit elements, a telegraph channel connecting the subscriber's station with one of said circuit elements, a second telegraph channel connecting the switchboard with the other of said circuit elements, terminal repeater stations connected by wire lines to said two circuit elements, at least one intermediate repeater station connected between said terminal repeater stations, and relay mechanism at said elements responsive to signals from said subscriber's station for conditioning said circuit elements to transmit said signals to said switchboard and vice versa.

41. A telegraph station line extension circuit extending from a central office to a subscriber's station comprising a single line repeater, relay apparatus external of said single line repeater and cooperating with said repeater for transmitting signals received by said line extension circuit, and metallic loop circuits connecting said extension circuit to terminations between which signals are transmitted.

42. In combination in a telegraph system, a subscriber's station, a central station, a line extension circuit intermediate said central station and said subscriber's station, lines connecting said line extension circuit with said subscriber's station and with said central station, said line extension circuit comprising circuit means for repeating telegraph signal impulses, said circuit means being responsive to ringing current from said central station for transmitting ringing current to said subscriber's station, said circuit means also being responsive to a reversal of current polarity on the line from said central station to transmit a reversal of current polarity to said subscriber's station.

43. A circuit for telegraphy comprising an electrically long line adapted to connect a subscriber with an exchange, said circuit comprising two groups of elements connected to each other by a telegraph channel, a first path constituting a part of said circuit extending from one group of elements toward a subscriber's station, a second path constituting another part of said circuit extending from the other group of elements toward an exchange, said first path normally terminating at the first group of elements, and devices in said groups of elements controllable from said subscriber's station over said first path to extend said circuit to said exchange.

44. A circuit for telegraphy comprising an electrically long line adapted to connect a subscriber with an exchange, said circuit comprising two groups of elements connected to each other by a telegraph channel, a first path constituting a part of said circuit extending from one group of elements toward a subscriber's station, a second path constituting another part of said circuit extending from the other group of elements toward an exchange, said second path normally terminating at said second group of elements, and devices in said groups of elements controllable from said exchange over said second path to extend said circuit to said subscriber's station.

45. A circuit for telegraphy comprising an electrically long line adapted to connect a subscriber with an exchange, said circuit comprising two groups of elements connected to each other by a telegraph channel, a first path constituting a part of said circuit extending from one group of elements toward a subscriber's station, a second path constituting another part of said circuit extending from the other group of elements toward an exchange, one of said paths being normally grounded at its terminus adjacent said channel, and devices controllable from a remote terminal of one of said paths whereby said grounded path may be disconnected from ground and cut through to complete said circuit for telegraphy from said subscriber's station to said exchange.

46. A subscriber's extension circuit for telegraph operation including a repeater having a normally unclosed ground connection, and devices controllable from the subscriber's station for closing said ground connection.

47. A subscriber's station connected to a subscriber's loop comprising a repeater connected to said subscriber's loop over an electrically long section of said loop, relay apparatus connected to said loop and controllable thereover whereby said subscriber controls the application of a ground in said repeater.

48. A telegraph connecting link circuit including a telegraphic impulse repeater, said repeater including a source of operating current in a normally currentless path, said link circuit having conductor terminals adapted for connection to a telegraph line, a device effective under the control of a connection of either of said terminals to a telegraph line to cause said source of operating current to supply current to said normally currentless path.

49. In a telegraph system, a subscriber's station including telegraph transmitting and receiving apparatus, a subscriber's line extending toward a central office and terminating at a telegraph repeater adapted for the repetition of telegraph impulses, and an extension line from said repeater to said office, instrumentalities whereby said repeater may be controlled from at least one of said station or office to transmit telegraphic signal impulses from said station to said office or vice versa, and instrumentalities whereby cyclically fluctuating current arriving from said office over said extension line is transferred as cyclically fluctuating current to said loop, and an instrumentality other than said telegraph receiving apparatus at said subscriber's station operated—under the normal nontelegraphic condition of said subscriber's station—by said fluctuating current.

50. A system in accordance with claim 49 in which the instrumentality other than the telegraph receiving apparatus comprises a ringer and which includes a driving motor for the telegraph transmitting apparatus and receiving apparatus and in which a relay actuated for the starting of said motor removes said ringer from operative relation to said line.

51. A system in accordance with claim 49, in which the telegraphic signaling current paths through said repeater are normally open and devices controllable remotely from said central office have contacts to close said paths.

52. In a telegraph system, a subscriber's station including printing telegraph apparatus, a subscriber's loop extending toward the central office and terminating at a telegraph repeater adapted for the repetition of make-and-break telegraph impulses, an extension line from said repeater to said office, instrumentalities whereby said repeater may be controlled from at least one of said station or office to transmit telegraphic signal impulses from said station to said office or vice versa, instrumentalities whereby current normally flowing over at least one side of said loop may be reversed in direction under the control of a device at said central office, and instrumentalities at said subscriber's station other than said printing telegraph apparatus operable—under the normal nontelegraphing idle condition of said substation—by said current reversed in direction.

53. A telegraph system including a central office and a subscriber's station, a line comprising a maximum of two conductors connecting said office and station, a repeater in said line, said repeater having its incoming and outgoing signaling paths normally open, instrumentalities at said repeater operable under the control of devices at said subscriber's station whereby said paths may be closed for telegraph communication and devices at said central office operable to control instrumentalities at said repeater whereby the said paths of said repeater may be closed for telegraph communication.

54. A telegraph system including a two-conductor circuit for the transmission of telegraph signal impulses from a central office to a subscriber's station and vice versa, a repeater in said circuit through which said telegraph impulses are relayed and equipment located at and connected to said repeater whereby calling current variations other than telegraph impulses may be transmitted from said subscriber's station to said central office, and equipment whereby a disconnect signal other than the telegraph impulses may be transmitted from said subscriber's station to said central office.

55. A telegraph system including a subscriber's station having telegraph equipment with a motor, a two-conductor circuit for the transmission of telegraph signal impulses from a central office to a subscriber's station and vice versa, a repeater in said circuit through which said telegraph impulses are relayed, and devices located at and connected to said repeater whereby, in addition to the transmission of telegraph impulses, current variations may be transmitted from said central office to said subscriber's station for calling said subscriber and devices whereby, upon the failure of said subscriber to answer, other current variations may be transmitted from said central office to said subscriber's station for starting the motor of said subscriber's telegraph equipment and rendering said equipment receptive to telegraph impulses arriving from said central office through said repeater.

56. A telegraph system for communicating over a two-wire line extending between a subscriber's station and a central office, a telegraph impulse repeater in said line for relaying said telegraph impulses, and equipment including a relay not operable by direct current but effective under the influence of periodic fluctuating currents whereby calling signals from said central office are transmitted to said subscriber's station, said relay being controlled over a circuit including at least one side of said line between said repeater and said central office.

57. A system including a subscriber's station telegraph equipment and a line extending to a central office having connecting circuits for connecting said line to printer devices thereat, and means operable under the control of a device at said office for applying alternating current to said line, means including an instrument (relay 202) in said line and controllable by said alternating current for controlling the performing of an operation at said subscriber's station, a motor at said subscriber's station, means for starting said motor by remote control from said central office, means operable by the starting of said motor for removing said instrument from operative relation with said line.

58. In a printing telegraph exchange system, a subscriber's station, a central office, a line therebetween, a calling device operable by fluctuating periodic current incoming to said subscriber's station, means including a relay (202) connected to said line and controllable by periodic fluctuating current to apply current thereto to control the operation of said calling device, a telegraph receiving mechanism at said subscriber station, means operable for setting said receiving mechanism into operative condition, and means controlled by the operation of said means for disconnecting said relay from said line.

59. A printing telegraph system comprising a central office having a supervisory signal, a subscriber's station including a teletype apparatus driven by a motor, a line extending therebetween, devices at said subscriber's station operable by remote control from said central office for starting said subscriber's motor and devices at said subscriber's station controlling said supervisory signal at said central office to give an indication indicative of the motor starting condition of said motor starting devices at said subscriber's station.

60. In a telegraph system, a line including a repeater for relaying telegraphic impulses between the sections of said line on opposite sides of said repeater, said repeater being normally disconnected from telegraphic impulse relaying condition with either side of said line, and devices at said repeater controllable from a remote end of said line for connecting said repeater into normal telegraph impulse relaying association with said line.

61. A telegraph system including a repeater effective under normal telegraphing conditions for the repetition of telegraphic make-and-break impulses from either to the other section of the line between which said repeater is connected, instrumentalities connected to said repeater whereby periodic alternating current arriving over one section of said line is relayed through said repeater and sent into the other section as similarly periodic alternating current, and a non-telegraphing instrument operable by said current flowing in the other section.

62. A two-way cord circuit for a telegraph exchange system for connecting subscribers' telegraph stations for communication purposes, an operator's telegraph printer set associated with said two-way cord circuit, a switching device in said cord circuit, circuit means responsive to the operation of said device for connecting said operator's telegraph printer set for communication with either of two subscribers connected together by said cord circuit.

63. In combination in a closed telegraph communication circuit between subscribers, a cord circuit, comprising a repeater connected between an answering plug and a calling plug, a switching device in said cord circuit, an operator's telegraph printer set associated with said cord circuit through said switching device, said device arranged upon operation in one direction to associate said operator's printer set to the subscriber connected to the answering plug and to disassociate said operator's printer from the subscriber connected to the calling plug, and said device arranged upon operation in another direction to associate said operator's printer set to the subscriber connected to the calling plug and to disassociate said operator's printer from the subscriber connected to the answering plug, said device being normally adapted to associate said operator's set with subscribers connected on both the answering and calling plugs of the cord circuit.

64. In a telegraph system in combination, a switchboard, a link circuit at said switchboard, a closed communication circuit involving said link circuit, a printer set at said switchboard, and a manually operable circuit opening and closing device for connecting said printer set through said link circuit with either terminal of said communication circuit or with both.

65. In a telegraph exchange system, a central office, a subscriber's station associated with said central office, a second subscriber's station associated with said central office, a link circuit at said office operatively connecting said two stations for telegraph communication, an operator's printer set associated with said link circuit, and manually operable key mechanism for connecting said printer set for communication with either one of said stations or with both of said stations.

66. A two-way repeater cord for a telegraph exchange system for connecting subscriber's telegraph stations for communication purposes, characterized in this, that a conference jack is provided in series with one side of the two-way repeater cord circuit for establishing a connection involving more than two subscribers' sets.

67. In a telegraph exchange system, a central office, a plurality of subscribers' stations individually connected thereto over loop circuits, cord circuits at said office, each cord circuit comprising a repeater connected between two plugs and having a jack connected in series with one side of said repeater circuit, said jack providing means for interconnecting any two or more stations in a common communication circuit, and an operator's telegraph printer set at said office with means for associating the same with a cord circuit for communication purposes.

68. A link circuit for a telegraph exchange system for connecting subscribers' telegraph stations for communication purposes including a conference jack serially connected in the communication circuit of said link circuit for establishing a connection involving more than two subscribers' sets.

69. A two-way cord circuit for telegraph exchange system for connecting subscriber's telegraph stations for communication purposes, characterized in this, that automatic machine ringing apparatus is provided in said cord circuit for signaling over a line, a switching device in said cord circuit, and circuit means responsive to a single operation of said switching device for automatically associating said ringing apparatus with said cord circuit.

70. A cord circuit comprising a repeater connected between an answering plug and a calling plug, relay means associated with said cord circuit, alternating current means associated with said relay means, a switching device associated with said answering plug, said relay means being responsive to operations of said switching device for associating said alternating current means with said answering plug in accordance with the operations of said switching device, a second switching device associated with said calling plug and additional relay means responsive to a single operation of said second switching device for automatically applying said alternating current at intervals over said calling plug.

71. A cord circuit comprising a repeater connected between two plugs, a switching device connected to one of said plugs, alternating current means for ringing purposes, a lamp signal associated with said cord circuit, circuit means responsive to a single operation of said switching device for associating said alternating current means at intervals with one of said plugs and for lighting said lamp during the time said alternating current is associated with said one plug.

72. A link circuit for manual telegraph exchange systems including a ringing current supply, switching means, and circuit means responsive to a single operation of said switching means for automatically associating said ringing current supply at intervals with one side of said link circuit.

73. A system comprising a subscriber printing telegraph apparatus, a subscriber line, a central exchange at which said subscriber line terminates along with other subscriber lines, an interconnecting circuit for interchangeably connecting said subscriber line with other subscriber lines for intercommunication therebetween, a key in said interconnecting circuit, devices at said subscriber station operable under the influence of said key to set the motor of the subscriber printing telegraph apparatus into operation, an indicating device effective after operation of said key to motor starting condition to indicate at said central exchange whether said motor has started, and instrumentalities controllable over the subscriber's line to control said indicating device to cause it to give said indication.

74. In a printing telegraph exchange system, a subscriber line terminating at a subscriber station equipped with printing telegraph apparatus including a motor, a jack at the exchange end of said line, a cord circuit having an answering plug for insertion in said jack, an operator's printer at said exchange, means for connecting it to communicate over said subscriber's line, and a device in said cord circuit in addition to said printer and separate from but connected to said answering plug controlling a relay at the subscriber station to start the motor of the printing telegraph apparatus thereat.

75. In a printing telegraph system, a subscriber printing telegraph apparatus connected to a line which terminates at an exchange, supervisory apparatus at the exchange end of said line, an interconnecting circuit for connecting said line interchangeably to other lines for communication thereover, and a device in said interconnecting circuit controlling the operation of a relay in said supervisory apparatus, and devices under the control of said relay controlling the operation of the motor of the subscriber printing telegraph apparatus.

76. A printing telegraph exchange system comprising a subscriber line equipped with subscriber printing telegraph apparatus including a motor, a calling device at the subscriber end of said line, a telegraph exchange including an interconnecting circuit for connecting said line interchangeably with other lines for communication thereover, terminals for connecting said interconnecting circuit with said subscriber line, a device in said interconnecting circuit actuatable to operate said calling device, and another device in said interconnecting circuit actuatable to cause the operation of said motor.

77. A system in accordance with claim 76, wherein an indicating device in said interconnecting circuit indicates the failure of the subscriber to respond to the operation of said calling device.

78. A system in accordance with claim 76, wherein the interconnecting circuit includes an indicating instrument to indicate to the operator at the exchange that the motor at said subscriber printing telegraph apparatus has been successfully set into operation.

79. In a printing telegraph exchange system, a first station, a second station, a printer at said second station and a motor for driving said printer, a line normally open to direct current connecting between said stations, means for closing said line to direct current, means responsive to said closure for connecting driving power to said motor, a relay having an armature at said first station, means also responsive to said closure for changing the current through said relay to move said armature, and means including an indicator at said first station controlled by movement of said armature to give an indication that driving power has been connected to said motor.

80. In a printing telegraph system, a local station having a teleprinter and a motor for driving said printer, a line extending to a distant station, means partly at said local station and partly at said distant station whereby operating current may be applied to said motor to start it by control from said distant station, a relay at said local station, the condition of said relay being changed by said application of current, an indicator separate and distinct from a teleprinter at said distant station, and instrumentalities whereby said indicator gives an indication characteristic of the application of operating current to said motor.

81. In a printing telegraph system, a first station, a second station, a printer at said second station and a motor for driving said printer, a line normally open to direct current directing said stations, operative means for closing said line to direct current, means responsive to the operation of said operative means for starting said motor, and means operable when the last element of said operative means has operated for causing an indication at said first station that said last element has operated in a manner which normally sets said motor into operation.

82. In a printing telegraph system, a line terminating at a printing telegraph set including a motor at one end and terminating at line terminating equipment including a jack at a central office, a plug in a cord circuit for connection to said jack, relay equipment individual to said line at said central office including a relay operable in a given sense by current of a given polarity only, said plug when associated with said jack for the purpose of calling or telegraphing over said line applying to said relay no current of said given polarity, means in said cord circuit for applying current of said given polarity to said relay, and means controllable by the operation of said relay to start the motor of said printing telegraph set.

83. A printing telegraph system comprising a subscriber's line terminating at a printing telegraph apparatus at one end and at the other end at line equipment including a three-terminal jack, a three-terminal plug for cooperating with said jack, said terminals on said plug and jack each including a telegraphic circuit terminal, a supervisory terminal, and a further terminal connected to control in accordance with the polarity applied thereto a polarized relay in said line equipment.

84. A telegraph system comprising a trunk circuit including a repeater and a cord circuit adapted to connect said trunk circuit to another circuit for communicating thereover, devices in said trunk circuit operable in cooperation with a supervisory signal in said cord circuit whereby ordinary signaling interruptions of said trunk circuit are ineffective but a relatively long interruption of said trunk circuit operates the devices in said trunk circuit to give a disconnect signal at the supervisory signal of said cord circuit.

85. A system in accordance with claim 84, in which locking arrangements maintain the disconnect supervisory signal until the cord circuit with which said signal is associated is disconnected from the trunk whereover said disconnect signal was given.

86. A telegraph trunk circuit terminating in jacks suitable for cooperation with cord circuits for communication thereover, a disconnect signal device in one of said cord circuits, means whereby said device is not responsive to normal opening of said trunk circuit in transmitting normal printer and break signal impulses, terminating equipment for said trunk circuit whereby operation of a disconnect key in said cord circuit when said cord circuit is connected to said trunk circuit followed by removal of the plug of said cord circuit from the jack of said trunk circuit opens said trunk circuit for a predetermined interval.

87. A telegraph trunk circuit terminating in a jack suitable for cooperating with the plug of a cord circuit for telegraphic intercommunication, a disconnect signal in said cord circuit, devices operable under the control of said plug by contact thereof with said jack for opening said trunk circuit for a predetermined time longer than a normal break signal for actuating said disconnect signal.

88. A system in accordance with claim 87, in which said disconnect signal comprises a lamp associated with the circuit extending over the plug and jack on the cord circuit and trunk circuit, respectively, to cause said lamp to flash.

89. A system in accordance with claim 87, provided with means whereby said signal upon being displayed is locked into displayed condition until discontinued by the operator at the cord circuit position where said signal is displayed.

90. In combination in a telegraph circuit, a central office, a second central office, a trunk circuit connecting both said central offices, a cord circuit at said first central office associated with said trunk circuit, a signal, and means at said second central office responsive to the operative association of said cord circuit with said trunk circuit for automatically energizing said signal.

91. A system in accordance with claim 90 characterized in this that said trunk circuit is a toll line trunk circuit and that said cord circuit includes means for automatically causing an impulsive change of current for actuating said means at said second central office.

92. In combination, a central office, a second central office, a line extending between said two central offices, a lamp indicator, circuit means at said second central office associated with said line for energizing said lamp indicator, and means responsive to telegraph printer signals for disassociating said lamp indicator from said circuit means.

93. In a communication system, a first station, a second station, there being at said second station a polar relay, a printer and a printer motor, a line open to direct current connecting said stations, means for closing said line to direct current operated over a circuit including said printer and said polar relay and for locking said line and a circuit of said printer motor by means under control of said polar relay, and means controllable from said first station for reopening said line to direct current and stopping said printer motor.

94. In a telegraph system, the combination of a central station, a switching board, a plurality of switching link circuits, a plurality of toll board operator's printer sets, key means whereby either of said printer sets can be connected into any one of said link circuits at will and whereby if an attempt is made to connect a printer into two or more link circuits simultaneously, the printer will be connected with only one of said link circuits and means whereby the remaining circuits will be or remain closed.

95. In a telegraph system, a central station, a local station connected therewith by a telegraph line, said telegraph line including a plurality of sections with telegraphic repeating means for repeating telegraphic impulses from one section into the other, a printer motor at said local station, means under control of said central station for starting and stopping said printer motor, and means under control of said local station for stopping said printer motor but conditioning said local station circuit for the restarting of said printer motor under the control of the central station over circuits including said line sections.

96. In a printing telegraph exchange system, a calling and a called station, means for establishing a connection from said calling to said called station through link circuits at a central office, means associated with said link circuits whereby the operator thereat may start the printer motor at the called station, and a relay controlled signal at the central office responsive to the operation of said motor starting means for indicating at the central office that the motor starting means of the called station have operated.

97. In a telegraph exchange system, in combination, a printer set, motor driving means for said set, circuit means and normally closed switching means located at said printer set, a switchboard, a link circuit at said switchboard, a key associated with said link circuit, a loop circuit extending from said circuit means to said switchboard and operatively connected to said link circuit, said circuit means being responsive to the manual operation of said key associated with said link circuit for starting said motor driving means, and said circuit means being responsive to the actuation of said normally closed switching means for stopping said motor driving means.

98. A system as set forth in claim 97 together with normally opened switching means at said printer set and signaling means at said switchboard responsive to the closure of said normally opened switching means for indicating the initiation of a subscriber's call, and responsive to the operation of said normally closed switching means for indicating the disconnection of a subscriber's call.

99. In a telegraph switching system, a subscriber line terminating in a jack of the multiple jack type at a central office, said jack having two elements for circuit connections in addition to a third or sleeve element, a calling device at the subscriber end of said line operable to indicate a call condition to said central office at said central office, and circuit instrumentalities controlled by operation of said device to calling condition to change the potential upon the sleeve of said jack.

100. In a telegraph system, a combination of the central station, a switching board, a switching board link circuit, a plurality of operator printer sets, switching means whereby either of at least two of said printer sets can be connected into one of said link circuits at will, said switching means being mutually exclusive of said printer sets whereby only one of said printer sets can be connected with one of said link circuits by operation of said switching means.

101. In a telegraph switching system, a telegraph line normally terminating at one end at an outlying station and at the other end at a central office in line equipment including a multiple type jack, said jack having a tip, ring, and sleeve, said outlying station including a teletypewriter having a driving motor, a switch for applying power to drive said motor, and means controlled by operation of said switch to motor driving condition to change the potential upon the sleeve of said jack.

102. A subscriber's extension circuit for telegraph operation including an outlying station and a central office station, a line between said stations including a repeater normally in non-repeating condition for telegraphic signals, means for extending a calling condition over said repeater from the outlying station to the central office to set up a call signal thereat, and means solely controllable from said central office for controlling said repeater to a repeating condition to enable telegraphic marking and spacing transmission over said repeater from said central office to said outlying office.

103. A telegraph system including an outlying office, a telegraph circuit to a repeater point which includes a repeater, a telegraph circuit from said repeater point to a central office, said repeater being normally in non-repeating relation to the telegraph circuits, and means solely controllable from the central office for putting said repeater in repeating relation for sending a message thereover by causing it to be repeated therethrough.

104. A telegraph system comprising two line sections, telegraphic repeater means between said line sections, a station upon each of said line sections remote from said repeater means, one of said stations having a teletypewriter equipment including a driving motor, means at the other said station for transmitting a normal idle condition and a motor start condition to said repeater point, relaying means at said repeater point operative automatically solely under the control of said other station for relaying said starting condition and said normal idle condition as well as marking and spacing conditions to said one station.

105. A system in accordance with claim 104, having the further feature of means at said other station to stop said driving motor solely under the control of said other station and thereafter leave said repeater means in condition whereby said one station may produce a calling condition at said other station.

106. A system in accordance with claim 104, further characterized in that after the transmission of said starting condition to said one station to start said driving motor said repeater is controllable from either station to automatically relay telegraphic marking and spacing code conditions from each said line section to the other.

107. In a telegraph switching system in which a subscriber's station having a teletypewriter with a driving motor is connected to a telegraph central office by means of more than one line section with a telegraph repeater connected between adjacent line sections, means in said repeater for repeating marking and spacing conditions over at least one wire of one of said line sections, an instrument controlled by polarity of current at said subscriber's station connected in circuit to start the driving motor thereof, means associated with said repeater for extending a motor starting condition of definite polarity under control from said central office to said instrument over a wire of said line used for telegraph transmission.

108. A system otherwise in accordance with claim 107 including means to relay over said repeater from said central office to said subscriber's station a motor stopping condition.

109. A telegraph system including a telegraph line composed of sections, means for telegraphing over said sections by varying the current therein in a manner to create a succession of impulses, a repeater adapted to relay such succession of impulses from one section of said line to another, means associated with said repeater whereby a reversal of current in one of said line sections relays a non-telegraphic control condition over an adjacent line section.

110. In a telegraph system comprising lines terminating at a switching point, a cord circuit having two terminals for interconnecting said lines in telegraphic communicative relation through said cord circuit, a monitoring or printer key for communicatively connecting telegraphic impulse emitting and receiving means to said cord circuit, and splitting means by which said lines may be split from intercommunicative relation without disconnecting either of said terminals from its associated line or otherwise opening either of said lines, said splitting means functioning independently of the presence or absence of the communicative relation of said telegraphic impulse emitting or receiving means to said cord circuit.

111. A printing telegraph switching system including a plurality of lines, a connecting circuit for connecting any two lines terminating at a switching point for intertelegraphic communication, switching means for adding at any switching point a third line terminating at said swtiching point for intercommunication with said other lines wherey all of said lines are in intercommunicative telegraphic relation.

112. A system in accordance with claim 111, further characterized by a disconnect signal associated with any of said lines in intercommunicative telegraphic relation, and means whereby said signal may be controlled to give a disconnect indication over any line from its terminus to an adjacent switching point whereat said disconnect signal is located and whereat said line is connected to one or more other lines.

113. A system otherwise in accordance with claim 111, wherein any one or more of said lines comprises a toll or long distance telegraph line including telegraph repeaters or relaying equipment.

114. A system of telegraphic toll line communication comprising a toll line of the type including telegraph repeaters, said line terminating at a terminus thereof in conductive contacts adapted to make contact with corresponding contacts of a link circuit for extending intercommunication to and from said toll line beyond said contacts, and instrumentalities whereby upon the existence of a telegraph communicative circuit over said line and contacts the separation of the corresponding contacts from the line contacts automatically sets up a disconnect indication at the opposite terminus of said line.

115. The method of transmitting a disconnect indication over a telegraphic trunk line of the type including telegraph repeaters and terminating at central offices in jacks which comprises separating a plug interconnected with a jack of said line from said jack and automatically causing in response to said separation the setting up of a disconnect indication at the remote terminus of said line.

116. In a telegraph system a central office, an outlying office and a telegraph channel connecting said offices including a terminal section adjacent each office and a central section between said terminal sections, said terminal sections being adapted for direct intercommunication by direct connection of their respective conductors, said central section being terminated in apparatus whereby it simulates to each terminal section two transmission conditions and a third supervisory condition enabling communication and supervision over said section under the control of said three conditions.

117. A system in accordance with claim 116 in which means are included whereby the third condition simulated is a motor control condition and in which said system includes apparatus whereby said central office starts a teletypewriter motor at said outlying office under the influence of said motor control condition.

118. A system in accordance with claim 116 in which in the idle condition of said channel said central section simulates a normally idle condition to each terminal section.

119. A telegraph link capable of transmitting a limited number of conditions, circuits at each terminal thereof connectable thereto capable of transmitting each of said conditions plus at least one other condition, means at each terminal of said link controllable by reception at said terminal of some one of said other conditions to control other means for sending from the other terminal a corresponding condition.

120. A system in accordance with claim 119 in which the means for controlling effects control by sending one of said limited conditions for a definite time and said other means comprises elements responsive thereto to recognize and respond thereto by sending on a definite one of said other conditions.

121. A system in accordance with claim 119 in which each of said means includes timing devices.

122. A system in accordance with claim 119 in which each of said means includes a stepping device and elements including a current source to cause said device to step.

123. In telegraph system, an outlying office, a central office, a telegraph channel of transmission establishable between said offices, said channel including telegraph repeaters of the type having a single circuit leading in each direction therefrom for the transmission of spacing and marking conditions in either direction, at least one of said repeaters being connected to the next adjacent repeater point of said channel by no more than a single conductive circuit, means for controlling said repeaters from either of said offices to establish a call signal at the other to notify an attendant at the other of a desire to communicate over said channel, and means for controlling said repeaters after the establishment of an intercommunication circuit to establish a disconnect condition to indicate a desire to cease communication.

124. A telegraph system including an outlying office, a central office, a telegraph line including said repeaters connected between said offices to form a transmission channel of telegraphic code impulses, at least one of said repeaters being of the type having a single conductive circuit extending in one direction therefrom as a part of said channel for the to and fro repetition of marking and spacing potential conditions in combination with supplementary means controlling said repeaters from one of said stations to transmit to the other of said stations a third potential condition for supervisory purposes.

GEORGE A. LOCKE.
FULLERTON S. KINKEAD.